United States Patent [19]
Watanabe

[11] Patent Number: 5,823,864
[45] Date of Patent: Oct. 20, 1998

[54] SHELLFISH TRANSFER DEVICE

[75] Inventor: Kohei Watanabe, Hakodate, Japan

[73] Assignee: Kabushiki Kaisha Towa Denki Seisakusho, Hokkaido, Japan

[21] Appl. No.: 772,114

[22] Filed: Dec. 20, 1996

[30] Foreign Application Priority Data

Feb. 29, 1996 [JP] Japan ................................. 8-067413

[51] Int. Cl.$^6$ ............................................. A22C 29/00
[52] U.S. Cl. ............................................. 452/182
[58] Field of Search ....................... 452/182, 183, 452/177, 12, 13, 1

[56] References Cited

U.S. PATENT DOCUMENTS

| | | | |
|---|---|---|---|
| 3,253,299 | 5/1966 | Harris | 452/1 |
| 3,495,293 | 2/1970 | Tolley | 452/1 |
| 3,828,398 | 8/1974 | Harris et al. | 452/13 |
| 4,304,029 | 12/1981 | Cox | 452/13 |
| 4,361,933 | 12/1982 | Rodman et al. | 452/13 |
| 4,439,893 | 4/1984 | Betts | 452/5 |
| 5,064,400 | 11/1991 | Stipe | 452/177 |
| 5,401,207 | 3/1995 | Hicks et al. | 452/1 |

FOREIGN PATENT DOCUMENTS

A 2-262934  10/1990  Japan.

*Primary Examiner*—Willis Little
*Attorney, Agent, or Firm*—Frishauf, Holtz, Goodman, Langer & Chick

[57] ABSTRACT

A shellfish transfer device comprising shellfish holders that respectively hold at least one shellfish; a shellfish push unit that forces shellfish of a predetermined exposure toward at least one of the shellfish holders; and a shellfish press-down unit that operates in synchronism with the shellfish push unit to exert a downward pressure to the shellfish held by the shellfish holder. Said predetermined exposure of the shellfish is substantially maintained relative to the shellfish holder during operation by the shellfish press-down unit. Preferably, the shellfish push member comprises one or more of movable shellfish pocket push members; at least one shellfish pocket supporting thereon the shellfish and forced by the shellfish pocket push members toward the shellfish holder; and one or more of movable shellfish push members that convey the shellfish on the shellfish pocket onto the shellfish holder. The shellfish pocket push members are first advanced and the shellfish push member are advanced after the shellfish pocket push members stop.

21 Claims, 27 Drawing Sheets

SHELLFISH TRANSFER DEVICE

BACKGROUND OF THE INVENTION

The present invention relates to a shellfish transfer device that transfers shellfish from a start position to a second position where shellfish are subjected to post-operation including piercing and insertion of guts.

FIGS. 28A and 28B show a prior art holder for holding and positioning shellfish such as scallop for piercing its ear end portions. An operator manually inserts two shellfish 111 in horizontal or laying state into the holder until the ear end portions 112 reach stoppers 115 and 116. The ear end portion 112 of one of shellfish 111 is positioned below a rope 100 and the other is above the rope 100.

When inserting two shellfish 111 into the holder, it can be confirmed that the ear end portion 112 of the upper shellfish 111 (left-hand one in FIGS. 28A and 28B) collides with the stopper 115. However, since the other stopper 116 is hidden below the upper shellfish 111 and the rope 100, the operator could not see the stop position of the lower shellfish (right-hand one) during insertion. Thus, shellfish inserting operation using the above described prior art holder should be a nervous, laborious task. When the shellfish 111, especially the lower one is out of position, the ear end portions 112 can not be pierced, making it impossible that the pierced shellfish is connected to the rope 100. In these drawings, reference numerals 117 represents brushes and 118 a base movable in arrowed directions.

Japanese patent laid-open publication No. 2-262934 has proposed a device having a holder unit 101 for temporary positioning of shellfish 111 and a pair of bipod springs 121 connected to a drive shaft 122, as shown in FIG. 29. In operation, as the drive shaft 122 is lowered the springs 121 exerts greater resilient force to the shellfish 111 held by the holder unit 101, thereby firmly positioning the shellfish for subjecting to the piercing operation.

However, press-down force given by the springs 121 is not sufficient to stand up to a great deal of load caused by a piercing drill. It is not easy to insert the shellfish 111 between legs of bipod springs 121.

Further, this prior art device is not suitably applicable to hold shellfish that may vary in size. For example, scallop is normally 5–8 cm in width and 1–2 cm in thickness. Of course, position of stoppers 113 is determined depending on size of the shellfish 111, but if the stoppers 113 are set at position suitable to hold small-size scallop, large-size scallop can not be held in position on the device. Similarly, the stoppers 113 positioned for large-size scallop are not suitable to hold small-size scallop. Thus, when using this prior art device, size variation of the shellfish is limited to a narrower range.

Additionally, with this prior art device, holding of the shellfish 111 depends on a precise control for positioning of stoppers 113 and positioning and force of springs 121 and brushes 114. This device is not provided with means for automatically correcting mis-positioning of the shellfish 111, which does not allow rough-and-ready supply of the shellfish to the device.

OBJECTS AND SUMMARY OF THE INVENTION

It is accordingly an object of the present invention to overcome the tile drawbacks of the prior art.

It is another object of the present invention to provide a shellfish transfer device that automatically transfers shellfish to a definite position where the shellfish is subjected to piercing operation, for example.

It is yet another object of the present invention to provide a shellfish transfer device capable of transferring shellfish with its posture being unchanged.

It is yet another object of the present invention to provide a shellfish transfer device that allows rough-and-ready supply of shellfish to a non-specific, rough position, which may be automatically corrected to a specific position where the shellfish is stably and fitly positioned to ready to accept piercing operation.

According to an aspect of the present invention there is provided a shellfish transfer device comprising shellfish holders that respectively hold at least one shellfish; a shellfish push unit that forces shellfish of a predetermined exposure toward at least one of the shellfish holders; and a shellfish press-down unit that operates in synchronism with the shellfish push unit to exert a downward pressure to the shellfish held by the shellfish holder. Said predetermined exposure of the shellfish being substantially maintained relative to the shellfish holder during operation by the shellfish press-down unit.

Preferably, the device further comprise a mechanical or electric interrelation member that moves the shellfish press-down unit in response to movement of the shellfish push unit.

In a preferred embodiment, the shellfish press-down unit comprises one or more of arm members rotatably connected to the shellfish push unit. The arm members are extended to above the shellfish mounted on the shellfish holder.

The arm member may comprise plural segments having different angles of inclination or dogleg-connected segments. The arm member may be substantially straight-extending.

In another preferred embodiment, the shellfish press-down unit comprises one or more of press-down members adapted to move horizontally and vertically.

The device may further comprise guide means that guides up-and-down movement of the shellfish press-down unit in response to horizontal movement of the shellfish push unit. The guide means may comprise one or more of guide rollers engageable with bottom of arm member of the shellfish press-down unit. The guide means may otherwise comprise one or more of cam members engageable with bottom of arm member of the shellfish press-down unit. Alternately, the guide means may comprise cylinders that separately operate the shellfish push unit and the shellfish press-down unit.

In another embodiment of the present invention, the shellfish push unit comprises one or more of movable shellfish pocket push members; at least one movable shellfish pocket supporting thereon the shellfish and forced by the shellfish pocket push members toward the shellfish holder; and one or more of movable shellfish push members that convey the shellfish on the shellfish pocket onto the shellfish holder. The shellfish pocket push members is first advanced and the shellfish push member is advanced after the shellfish pocket push members stop.

In this embodiment, the shellfish pocket push members and the shellfish push members may comprise shaft members, respectively.

The shellfish pocket push members and the shellfish push members may comprise cylinders having different telescoping strokes.

The shellfish pocket push members may comprise shaft member. The shellfish press-down unit may comprise arm members pivotably connected to a base end of the shaft member.

The shellfish pocket push members may comprise one or more of shellfish pocket push shaft fixed at its base end to a first shaft holder and slidably extending through a second shaft holder connected to the first shaft holder by a spring and also by an engaging plate, and the shellfish push members comprise one or more of shellfish push shafts fixed at its base end to the second shaft holder and extending in parallel with the shellfish pocket push shaft. Preferably, a spring is used to force the shellfish push members toward the shellfish pocket.

In a still preferred embodiment, the shellfish push unit and the shellfish press-down unit are moved in response to circulation of intermittently driven endless conveyor.

Particularly, there are first and second intermittently driven endless chain conveyors. The first chain conveyor has spaced chain blocks each having a pin engageable with the shellfish push members. The second chain conveyor has spaced chain blocks each having a pin engageable with the shellfish pocket push members.

In another preferred embodiment, the shellfish push unit and said shellfish press-down unit are driven by a single drive source.

The above and other objects, features and advantages of the present invention will become apparent from the following description when read in conjunction with the accompanying drawings, in which like reference numerals designate the same elements.

DETAILED DESCRIPTION OF THE PREFERRED EMBODIMENTS

Figure 1:
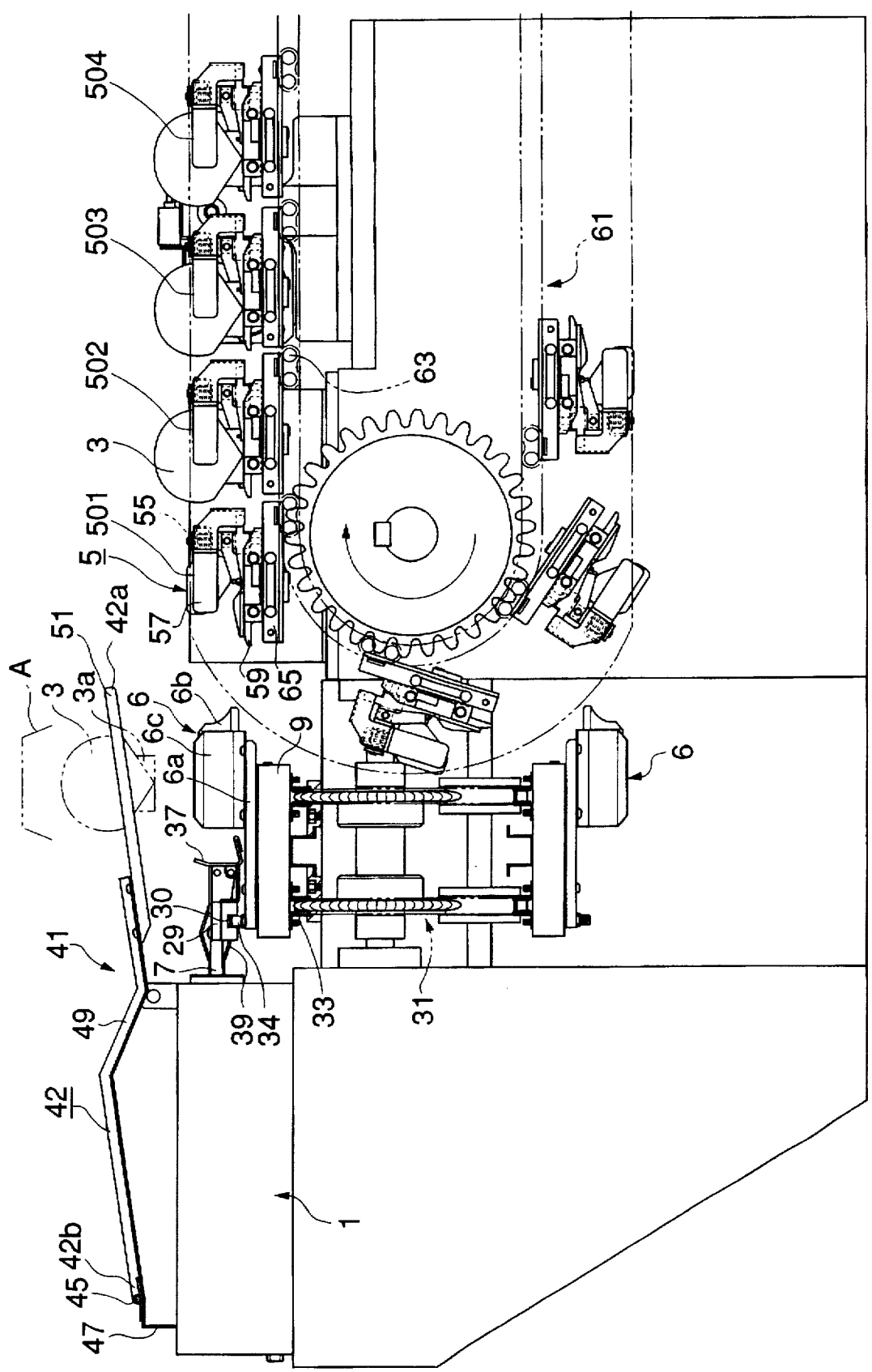
FIG. 1 is a front view showing a shellfish transporting device embodying the present invention.

FIGS. 1–6 shows a shellfish transfer device in accordance with a preferred embodiment of the present invention. In the drawings, a reference numeral 1 indicates a shellfish push unit that forces shellfish such as scallop 3 toward a shellfish holder 5. Shellfish push unit 1 includes a shellfish pocket push shaft 7 that is axially movable to the right to thereby force a shellfish pocket 6 toward shellfish holder 5. Shellfish push unit 1 also includes a pair of parallel extending shellfish push shafts 11 that is axially movable to the right to throw the scallop 3 in shellfish pocket 6 into shellfish holder 5. Push shafts 7 and 11 are all extending in parallel relationship. FIG. 1 shows both push shafts 7 and 11 in their retracted or standby positions.

Shellfish pocket push shaft 7 has a base end 13 fixed within a shaft holder 15. Spaced apart from shaft holder 15 is another shaft holder 17 that allows shaft 7 to slidably pass therethrough. Shaft holders 15 and 17 are connected by a spring 19 (FIG. 5) that urges shaft holder 15 toward each other.

An engaging plate 21 is rotatably connected to shaft holder 17 and engageable with shaft holder 15. Engagement between plate 21 and shaft holder 15 is released when plate 21 collides with a release plate 35 as it moves to the right from the initial position shown in FIGS. 4 and 5.

The underside of shaft holder 17 recessed to form a crosswise groove 18 for receiving a pin 25 upstanding from a specific point of an endless chain 23 driven by a motor 27.

To the tip end of shellfish pocket push shaft 7 is fixed an actuating member 29a. Actuating member 29a has a lower groove 30 that receives a pin 34 planted on the rear end of a base 6a (FIGS. 8–10) of one of plural shellfish pockets 6 conveyed by a pair of endless chains 33 of a chain conveyor 31. Shellfish pockets 6 are connected to chains 33 and arranged at a predetermined equal spacing therebetween.

Each shellfish push shaft 11 has a base end fixed to shaft holder 17 and a tip end 36 that pivotably connects an actuating attachment 37 via a spring 39. The tip end 38 of actuating attachment 37 is notched (most clearly seen in FIG. 5) in conformity to the shape of shellfish to be handled in the device. Spring 39 is biased to force actuating attachment 37 forward so that any size of shellfish or scallop thrown into pocket 6 can be effectively forced by actuating attachment 37 toward shellfish holders 5.

A plurality of (for example, fifteen) shellfish pockets 6 are mounted on conveyor 31 at an equal spacing therebetween. Shellfish pockets 6 circulates as chain conveyors 33 of conveyor 31 are driven in a predetermined direction shown by arrows in FIGS. 2, 3, 5 and 7.

Figure 8:
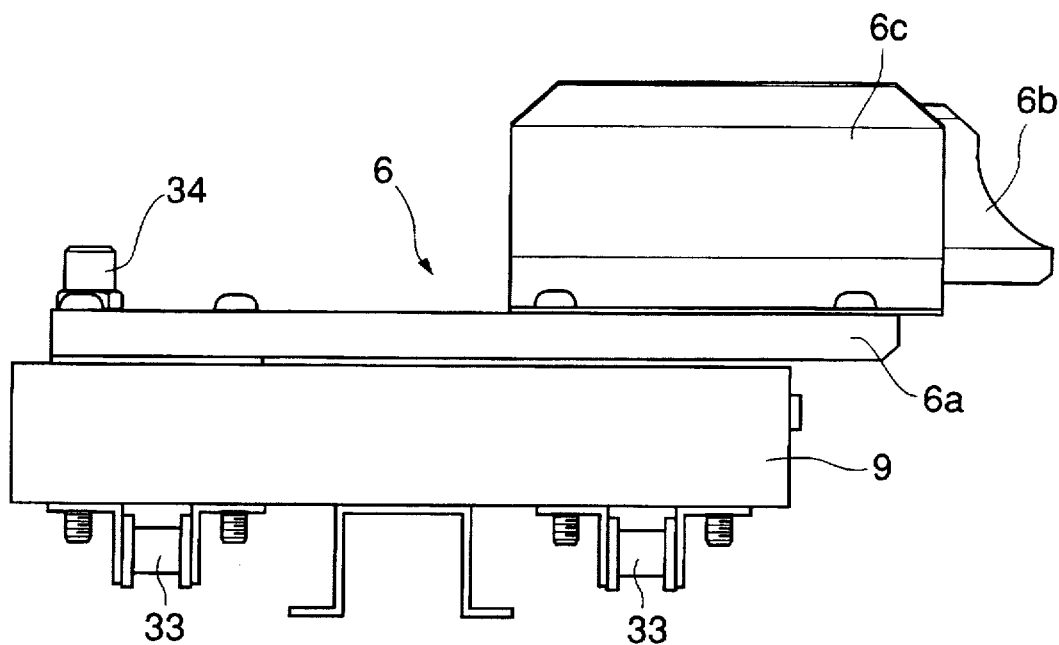
FIG. 8 is a front view showing a shellfish pocket used in the device of FIG. 1.
Figure 9:
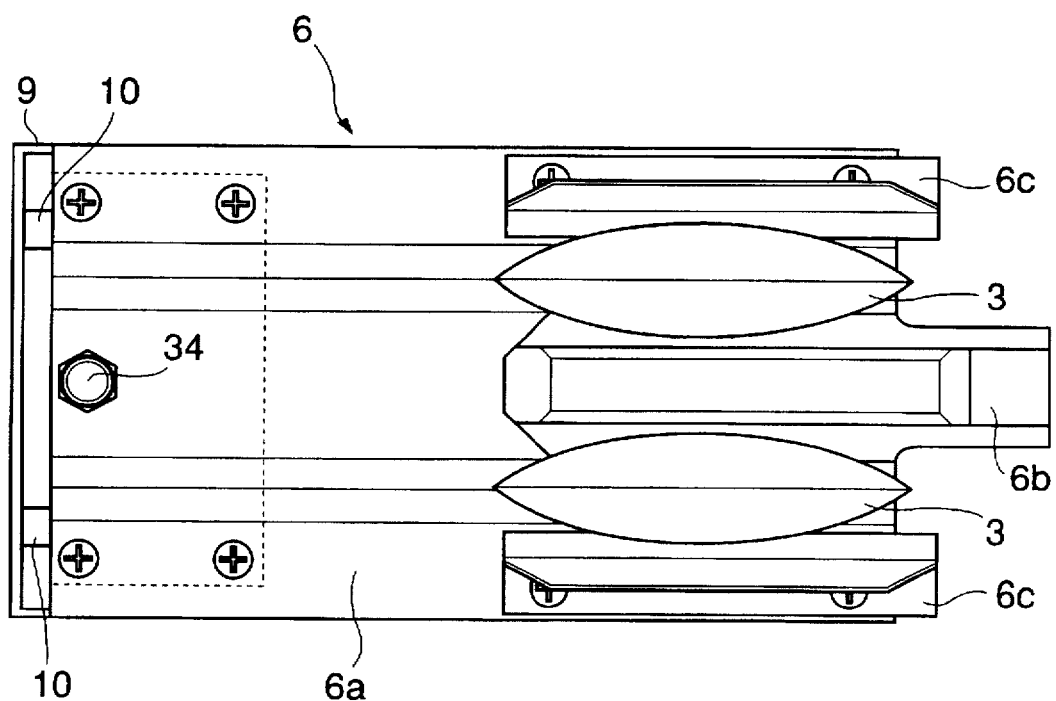
FIG. 9 is a plan view of the shellfish pocket shown in FIG. 8.
Figure 10:
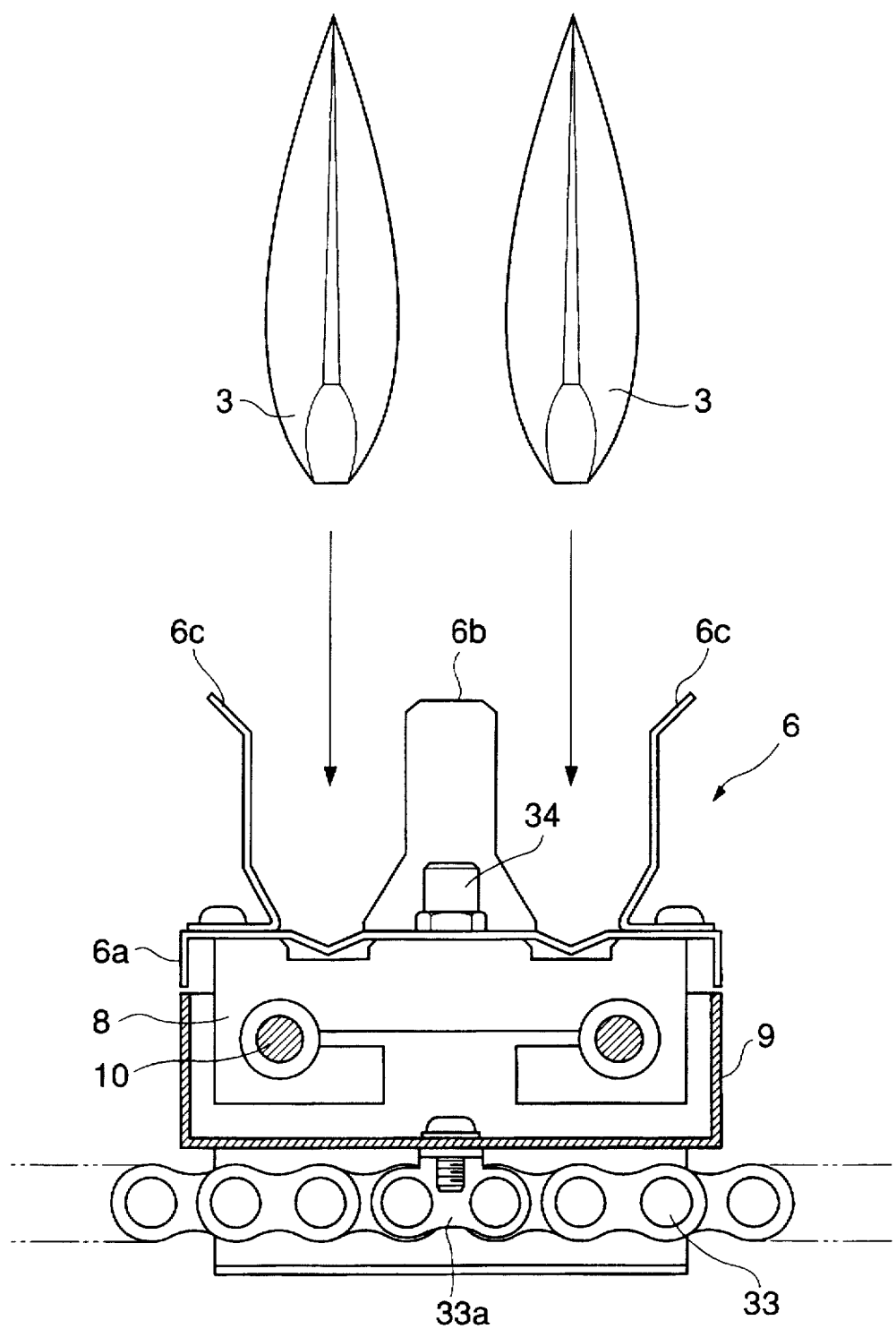
FIG. 10 is a leftside view of the shellfish pocket shown in FIG. 8.

Referring specifically to FIGS. 8–10, each shellfish pocket 6 comprises a base 6a, a center wall 6b and a pair of side walls 6c. Center wall 6b and side walls 6c are secured to the front portion of base 6a in parallel relation. Base 6a is fixedly mounted on a conveyor block 8 that is, in turn, received in a housing 9 fixedly connected to a chain train 33a of chain conveyor pair 33. A pair of parallel guide rods 10 extend in housing 9 for allowing conveyor block 8 to move relative to housing 9 in longitudinal directions. The above-described pin 34, engageable with groove 30 of actuating member 29a, is fixed to conveyor block 8 through an aperture (not shown) of base 6a. Thus, shellfish pocket 6 is movable from its standby position, shown in FIGS. 8–10, to the right, with respect to housing 9. Such movement is caused by forward axial movement of shellfish pocket push shaft 7 and guided by rods 10.

A shellfish press-down unit 41 includes a pair of parallel, spaced arms 42 having tip ends 42a extended to above shellfish pockets 6. Hinge members 45 connects base ends 42b of arms 42 to a single bracket 47 fixedly mounted to the above-described shaft holder 15. Thus, arms 42 moves together with shellfish pocket push shaft 7.

Figure 4:
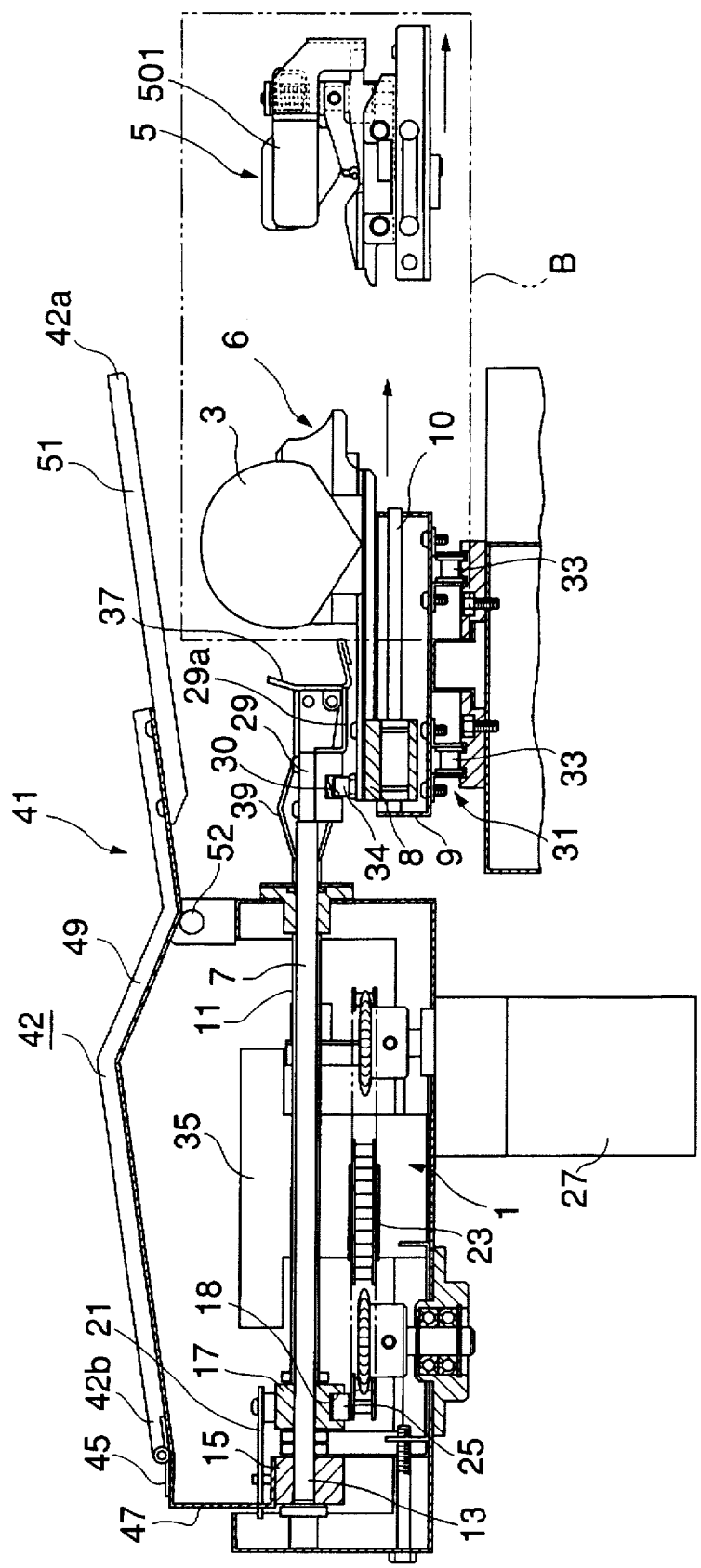
FIG. 4 is a longitudinal cross-sectional view of a part of the device shown in FIG. 1, when the device is in a retracted position.
Figure 6:
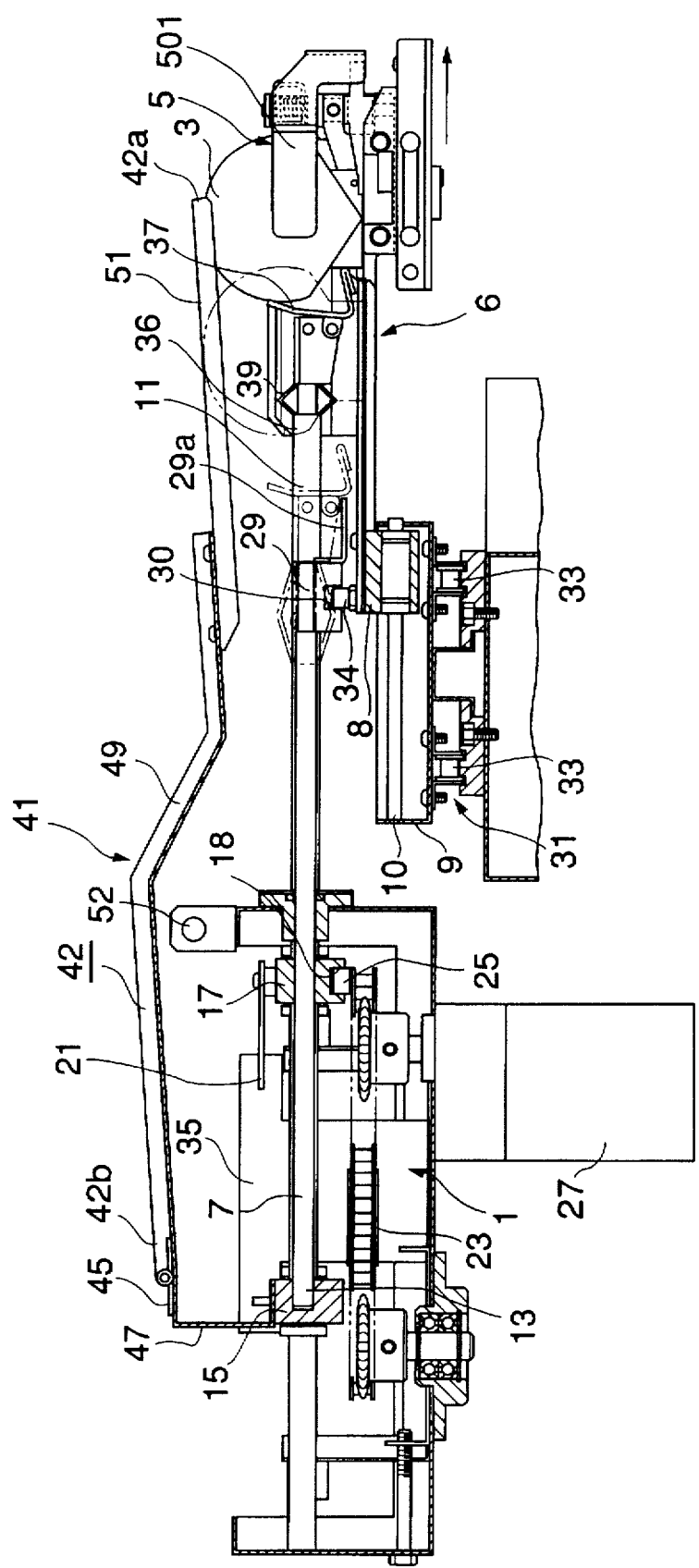
FIG. 6 is a longitudinal cross-sectional view of a part of the device shown in FIG. 1, when the device is in an operative position.

Each arm 42 is a combination of a first arm member 49 having the hinged base end 42b and a straight extending second arm member 51 having tip end 42a. The underside of second arm member 51 is recessed or notched in conformity of the shape of shellfish 3 so that shellfish 3 can be stably clamped between second arm members 51 of arms 42. First arm member 49 comprises several (three in the illustrated embodiment) segments having different angles of inclination. A guide roller 52 is arranged at a fixed position, beneath first arm members 51. FIG. 4 shows arms 42 in open position where a point near a convex defined by second and third segments of first arm member 49 is supported on guide roller 52. Arm 42 is opened and closed depending upon which point of first arm member 49 being in contact with guide roller 52, as can be seen in FIGS. 4 and 6 in comparison.

A sensor 53 (FIG. 5) detects the initial position of shaft holder 15. When shaft holder 15 completes one cycle movement, that is, it moves from the initial position to the right to an operative position and returns to the initial position, sensor 53 outputs a signal to stop motor 27. Another sensor 54 outputs a signal to close a holding plate (to be described below) when shaft holder 17 passes therebeside.

Figure 11:
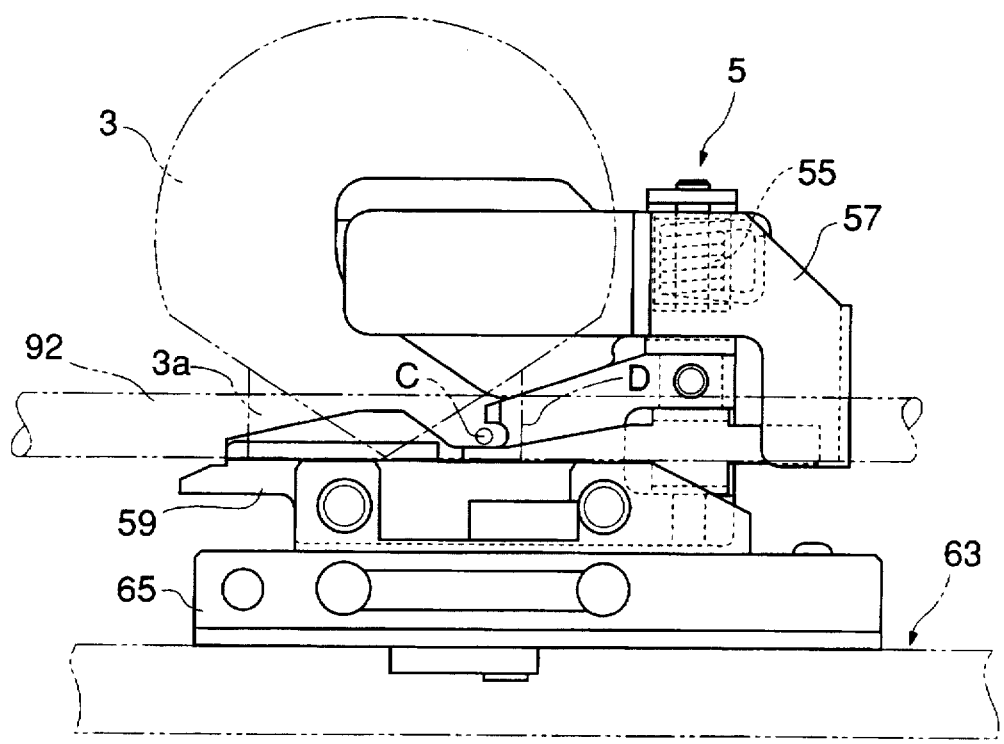
FIG. 11 is a front view showing a shellfish holder used in the device of FIG. 1.
Figure 12:
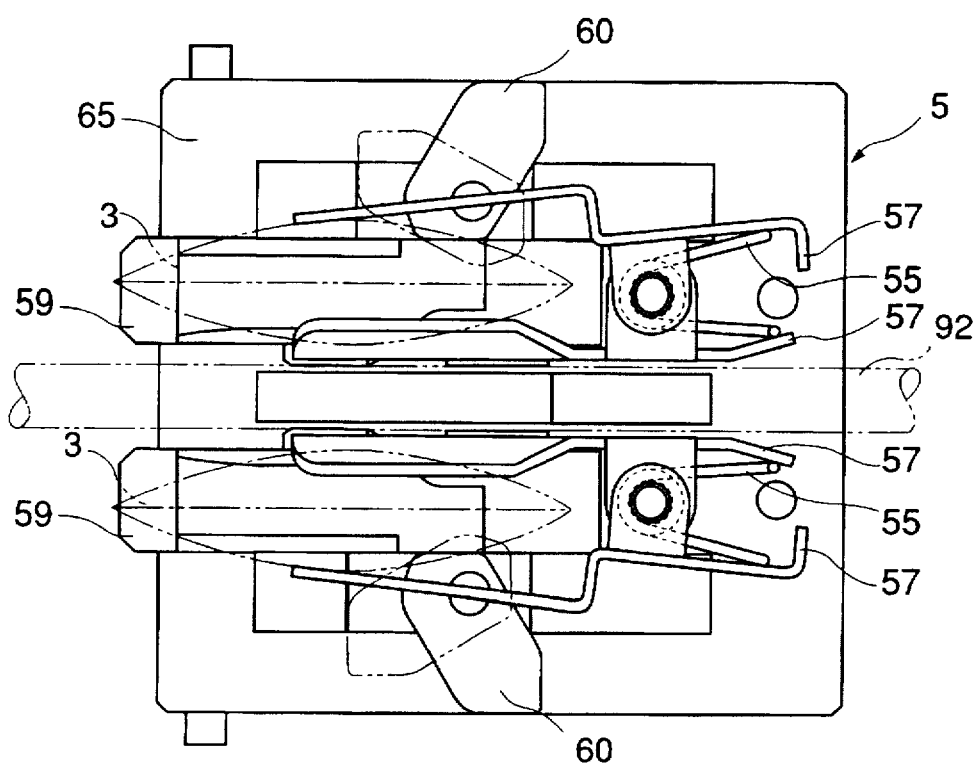
FIG. 12 is a plan view of the shellfish holder shown in FIG. 11.

Referring specifically to FIGS. 11 and 12, each shellfish holder 5 has a conveyor block 65 fixedly connected to a chain block 63 of an endless chain conveyor 61. A plurality of (for example, eighteen) shellfish holders 5 are mounted on conveyor 61 at an equal spacing therebetween.

On conveyor block 65 are mounted a pair of parallel spaced shellfish holding assemblies, each comprising a platform 59, a pair of nipper plates 57 and a spring 55 that urges nipper plates 57 to separate each other.

Platforms 59 are moved toward each other by rotation of cam members 60 to grip a culture rope 92 therebetween.

In the drawings, A represents a casting station where shellfish 3 is thrown into shellfish pocket 6 and B represents a delivery station where shellfish 3 is transferred from shellfish pocket 6 to shellfish holder 5. Shellfish supported by holders 5 are pierced with a conventional piercing machine at a piercing station C in FIGS. 2 and 11. Position D in FIG. 11 shows a position where the transferred shellfish 3 collides with a stop wall (not shown) of holder 5.

Conveyer 31 circulates on a crosswise vertical plane and is intermittently driven so that each shellfish pocket 6 mounted thereon stops for a predetermined period at spaced positions, including an tipper center position just beneath shellfish press-down un it 41. Conveyer 61 circulates on a longitudinal vertical plane perpendicular to the circulating plane of conveyor 31 and is intermittently driven so that each shellfish holder 5 mounted thereon stops for a predetermined period at spaced positions, including upper positions in alignment with the upper center position of shellfish pocket 6. Thus, there is a straight-extending path of shellfish delivery from on-pocket position to on-holder position.

In operation, first, shellfish are successively thrown into shellfish pockets 6 at the casting station A. When being thrown into pocket 6, shellfish 3 is postured with its ear end portions 3a down. Shellfish pocket 6 holding two shellfish (see FIGS. 9 and 10) is transferred to the delivery station B (see FIGS. 2 and 3) as conveyor 31 circulates in the arrowed direction in FIG. 2.

Figure 5:
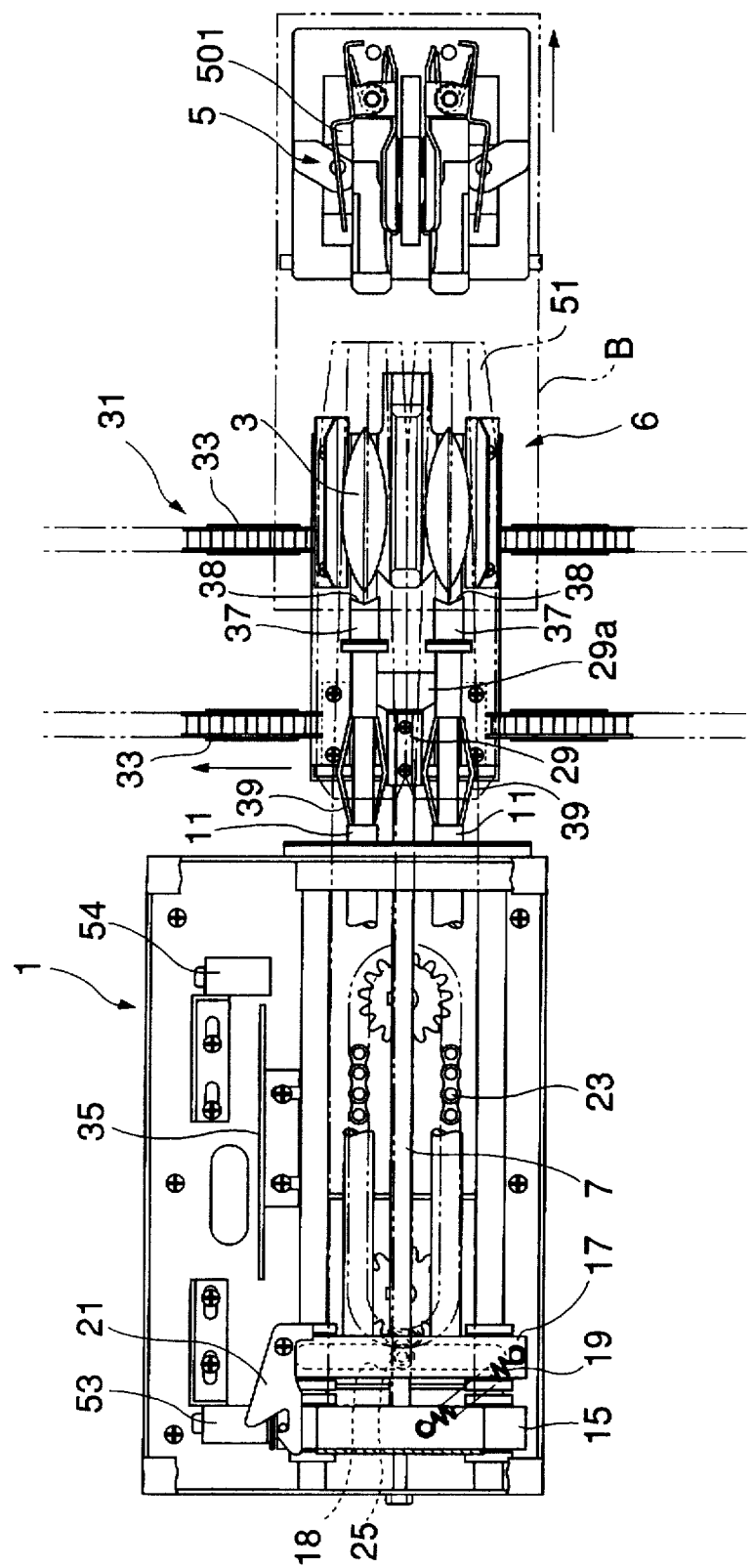
FIG. 5 is a plan view of the part shown in FIG. 4.

At the delivery station B, as shown in FIGS. 4 and 5, pin 34 of pocket 6 becomes engaged with groove 30 of actuating member 29a of shellfish pocket push shaft 7. At this time, pin 25 of chain 23 is received within groove 18 on the bottom of shaft holder 17 at the initial, leftmost position shown in FIG. 5. While conveyor 31 is at a standstill so that a specific shellfish pocket 6 remains at the delivery station B, pin 25 of chain 23 is moved to circulate in a clockwise direction (in FIG. 5), causing shaft holder 17 to move to the right. Shaft holder 15, connected to shaft holder 17 by engaging plate 21, also moves to the right. Accordingly, shellfish pocket push shaft 7 and shellfish push shafts 11 are moved to the right as a one-piece unit.

Figure 7:
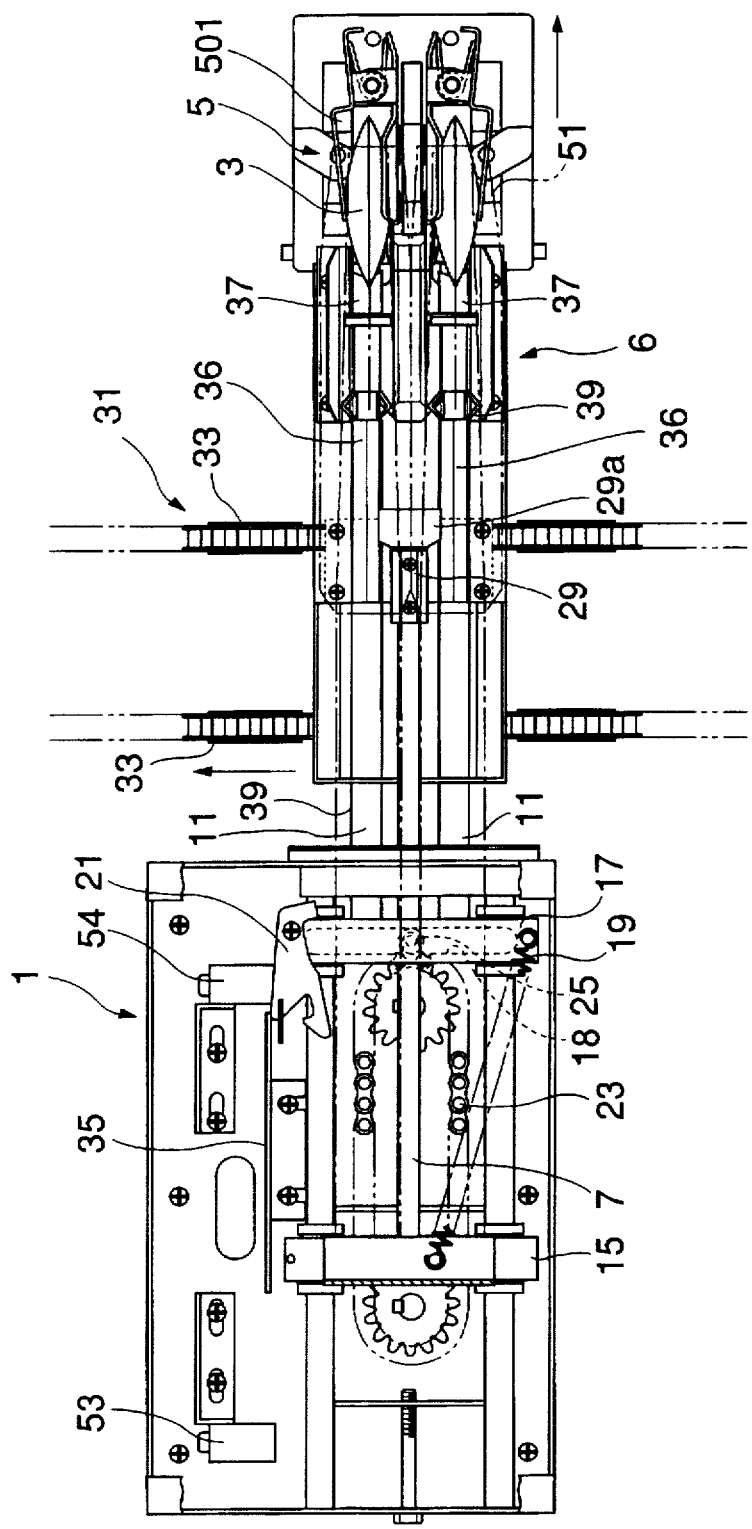
FIG. 7 is a plan view of the part shown in FIG. 6.

Rightward movement of shellfish pocket push shaft 7 causes shellfish pocket 6 at the delivery station B to move from the initial position shown in FIGS. 4 and 5 to the advanced position shown in FIGS. 6 and 7, by engagement between pin 34 and groove 30. When shellfish pocket 6 collides with shellfish holder 5, it stops at the advanced position.

Before shellfish pocket 6 reaches the advanced position, engaging plate 21 is rotated in a counterclockwise direction (in FIGS. 5 and 7) by collision with release plate 35 so that shaft holder 15 separates from shaft holder 17. After engagement between shaft holders 15 and 17 has been released, shaft holder 15 continues to move to the right by the force of spring 19, but soon stops when shellfish pocket 6 collides with shellfish holder 5.

On the other hand, even after shaft holder 15 comes to a stop, shaft holder 17 still continues rightward movement causing continued movement of shellfish push shafts 11, due to engagement between groove 18 and pin 25 of circulating chain 23. Shellfish 3 on shellfish pocket 6 are forced by actuating attachments 37 of shafts 11 to separate from shellfish pocket 6 and move alone from the on-pocket position shown by phantom lines in FIG. 6 toward the position shown by solid lines where shellfish 3 are held between nipper plates 57.

Spring 19 urges shaft holder 15 toward shaft holder 17 so that shellfish pocket 6 remains in contact with the rear wall of shellfish holder 5, facilitating smooth insertion of shellfish 3 into holder 5.

Arms 42 of shellfish press-down unit 41 is moved together with shaft holder 15, while being guided by guide roller 52. Thus, when shellfish pocket 6 is brought to the advanced position, as shown in FIG. 6, second arm members 51 lie substantially horizontally to exert a downward pressing force to shellfish 3 supported on pocket 6 and also on holder 5. Thus, the original posture of shellfish 3 (with the ear ends 3a down) is maintained even during transfer from shellfish pocket 6 to shellfish holder 5. Transfer stroke may change depending on the size of shellfish 3, but can be absorbed by spring 39 between the leading end 36 of shellfish push shaft 11 and actuating attachment 37.

When circulating pin 25 reaches the rightmost position of a loop of chain 23, that is, when shaft holder 17 reaches forward end of its stroke, this is detected by sensor 54 that outputs a signal to close nipper plates 57 of shellfish holder 5, thereby holding and clamping shellfish 3 therebetween, as shown in FIGS. 6 and 7.

Figure 2:
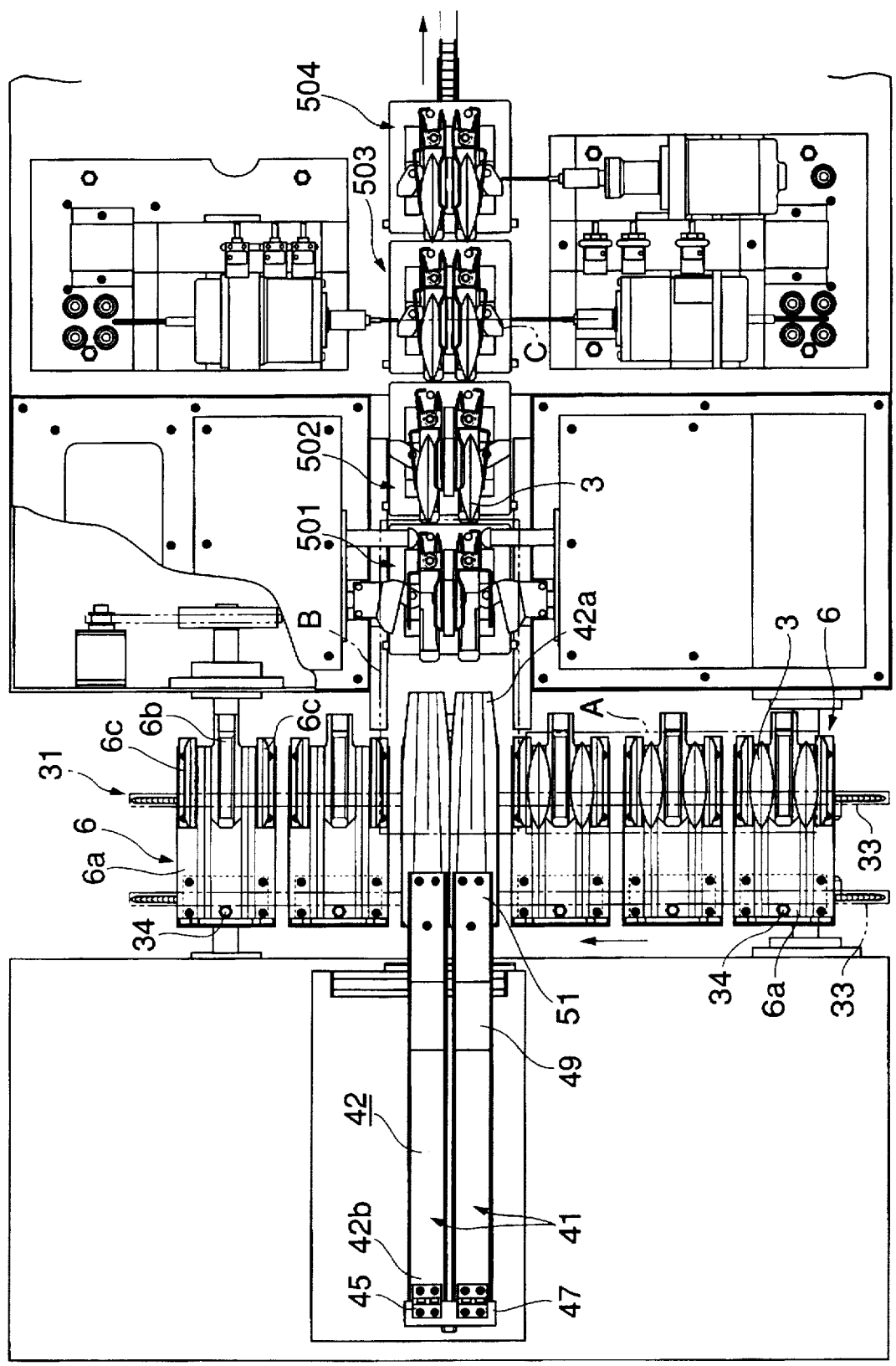
FIG. 2 is a plan view of tile device shown in FIG. 1.
Figure 3:
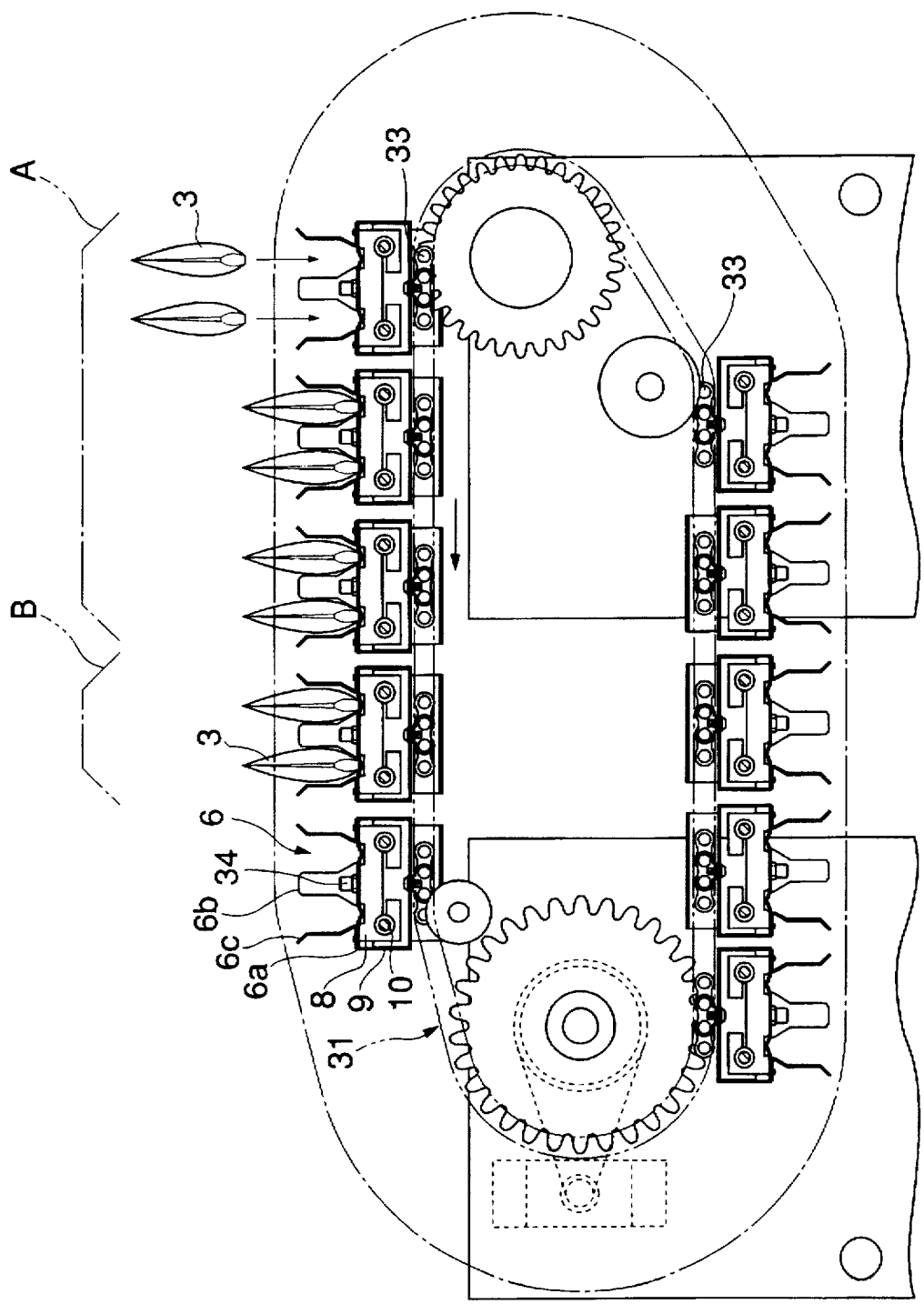
FIG. 3 is a partially broken leftside view of the device shown in FIG. 1.

Shellfish holder 501 shown in FIGS. 1 and 2 is in a standby position where it awaits entry of shellfish 3 from shellfish pocket 6. Shellfish holder 502 at the next stop holds the transferred shellfish 3 between closed nipper plates 57. Shellfish holder 503 at the stop next to that of shellfish holder 502 is subjected to the next process, for example, piercing process at the piercing station C. Shellfish holder 504 at the stop next to that of shellfish holder 503 is subjected to the post-piercing process including drilling to check and clean a pierced hole.

After shellfish 3 is transferred to holder 5 (501), shaft holder 17 is returned from the rightmost position to the initial leftmost position, as pin 25 received in bottom groove 18 of shaft holder 17 moves to the left along with circulation of chain 33. Shellfish push shaft 11 connected to shaft holder 17 also moves to the left. During leftward movement of shaft holder 17, engaging plate 21 comes into engagement with a pin (not indexed) of shaft holder 15. After that, shaft holders 15 and 17 moves to the left as a one-piece unit. Shellfish pocket push shafts 7 connected to shaft holder 15 also moves to the left, causing shellfish pocket 6 to move to the left and return to its initial position shown in FIGS. 4 and 5, due to engagement between bottom groove 30 of actuating member 29a and pin 34 of shellfish pocket 6.

When sensor 53 detects that shaft holder 15 is returned to the initial leftmost position of FIGS. 4 and 5, it outputs a signal to stop motor 27, resulting in stop of circulation of chain 23. Then, conveyor 31 begins running to convey the next shellfish pocket 6, which already receives shellfish 3 at the casting station A, to the delivery station B. When shaft holder 15 returns to the initial leftmost position, pin 34 that has been received within bottom groove 30 of actuating member 29a is also returned to its initial position, allowing pin 34 to pass through and separate from bottom groove 30 when conveyor 31 begins running.

In the meantime, conveyor 61 can begin running to convey shellfish holders 5 to the next stop positions respectively, after shellfish pocket 6 conveys shellfish 3 to shellfish holder 501 and then separate therefrom in response to return of conveyor 31. Of course, conveyor 61 can be driven in synchronism with conveyor 31. If it is the case, conveyor 61 may be driven such that shellfish holders 5 stays in the respective stop positions for longer period than shellfish pockets 6, making it possible that shellfish 3 in shellfish holders 501 at the delivery station B, 502 at the piercing station C and 503 at the post-piercing station can be subjected to respective operation for sufficient period of time.

As described above, the present invention makes it possible for shellfish to be transferred to given positions while remaining its original posture. The present invention provides an automated system for conveying and positioning shellfish, resulting in labor-saving, improved working efficiency and cost reduction.

Having described preferred embodiment of the present invention with reference to FIGS. 1–12, it is to be understood that the invention is not limited to those precise embodiments and that various changes and modifications may be effected therein by one skilled in the art without departing from the scope or spirit of the invention as defined in appended claims.

For example, operation of shellfish push unit 1 and shellfish press-down unit 41 can be interrelated mechanically, electrically or electronically. The above described embodiment employs one example of mechanical interrelation. Another mechanical interrelation may be designed by using a guide plate in place of guide roller 52.

Figure 13:
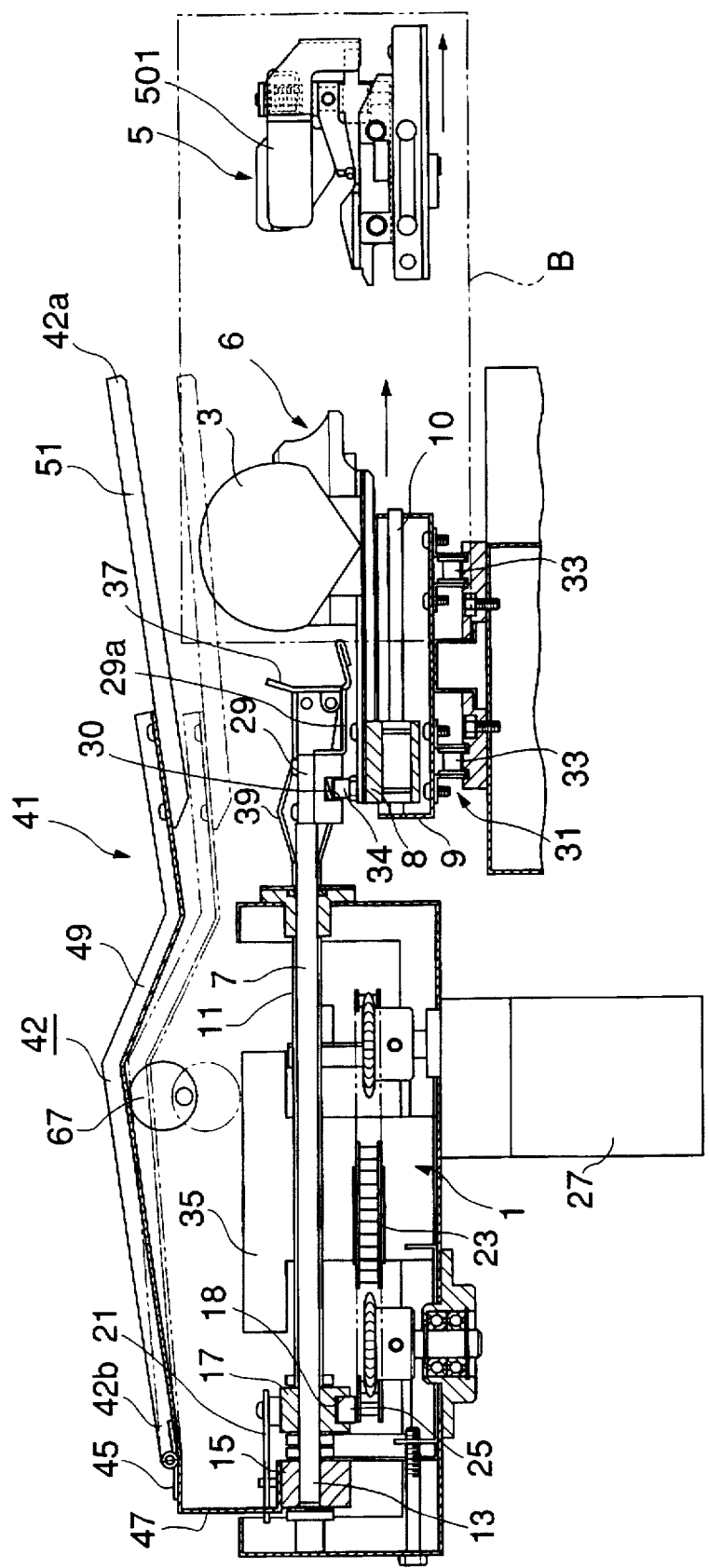
FIG. 13 is a longitudinal cross-section, showing a part corresponding to that shown in FIG. 4, of a modified embodiment of the shellfish transporting device.
Figure 14:
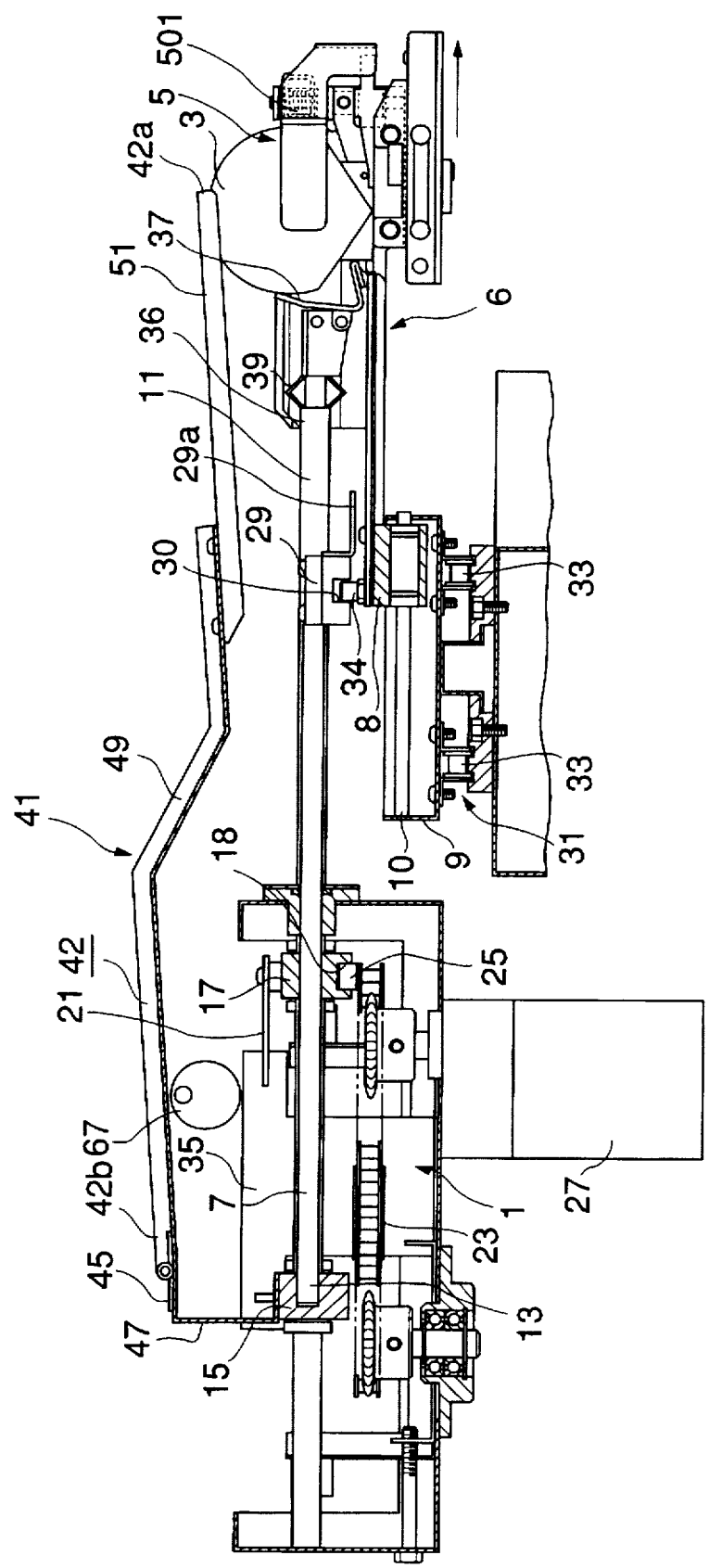
FIG. 14 is a longitudinal cross-section of the part shown in FIG. 13 when the device is brought to an operative position.

Alternately, guide means may be a cam. Shown in FIGS. 13 and 14 is a modified embodiment of the shellfish transfer device according to the present invention employing an eccentric cam 67 as guide means. Cam 67 is initially positioned as shown by solid lines, but changed to a lower position shown by double-dotted lines by 180 degree rotation so that shellfish 3 mounted on shellfish pocket 5 in the delivery station is held down by arm 41 (more specifically second arm member 51)that has been brought to the lower position shown by double-dotted lines in FIG. 13. This angular position of cam 67 maintains during delivery of shellfish 3 from pocket 6 to holder 501, as shown in FIG. 14. Thus, with this embodiment, posture of shellfish 3 is maintained throughout shellfish delivery operation from pocket 6 to holder 501. After such delivery, cam 67 is returned to the initial angular position by further 180 degree rotation.

Figure 15:
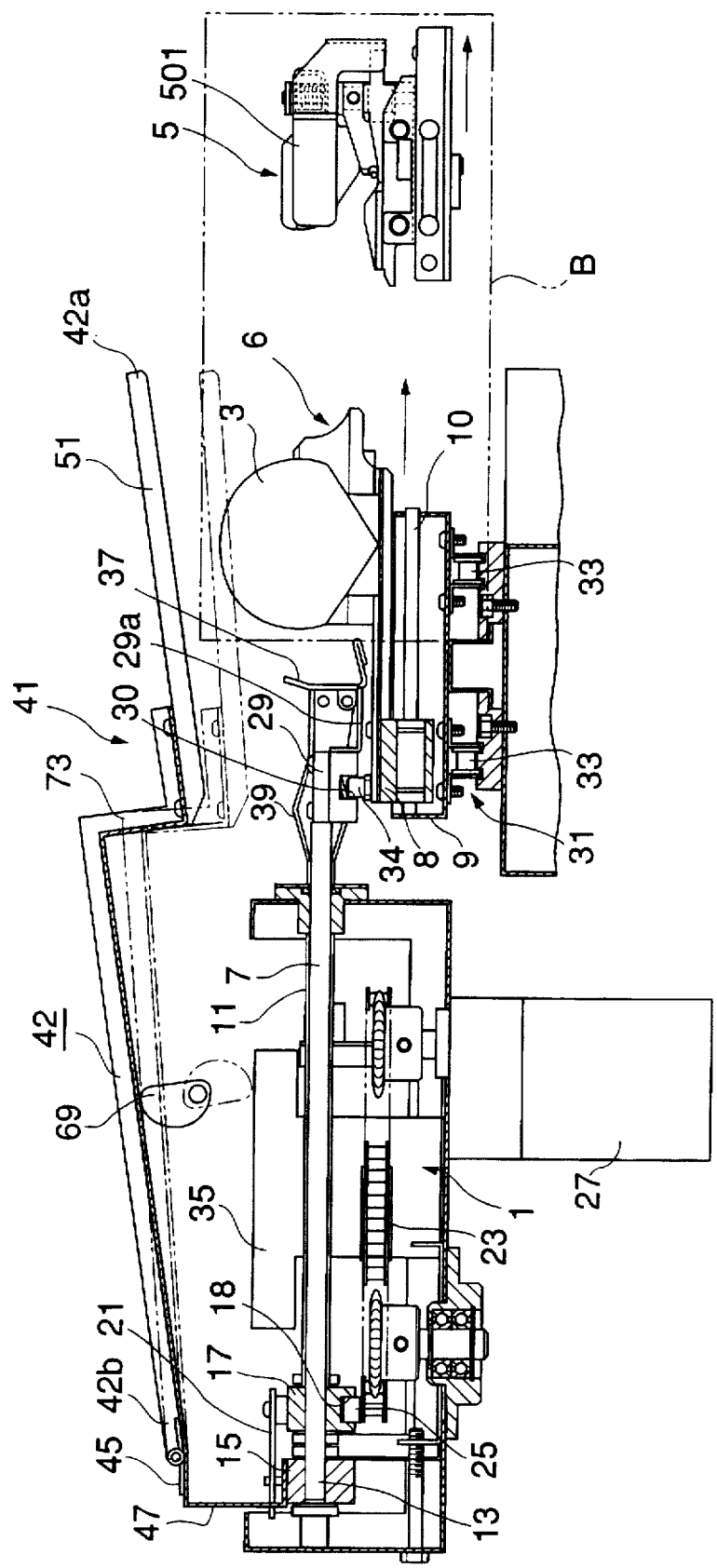
FIG. 15 is a longitudinal cross-section, showing a part corresponding to that shown in FIG. 4 or FIG. 13, of another modified embodiment of the shellfish transporting device.
Figure 16:
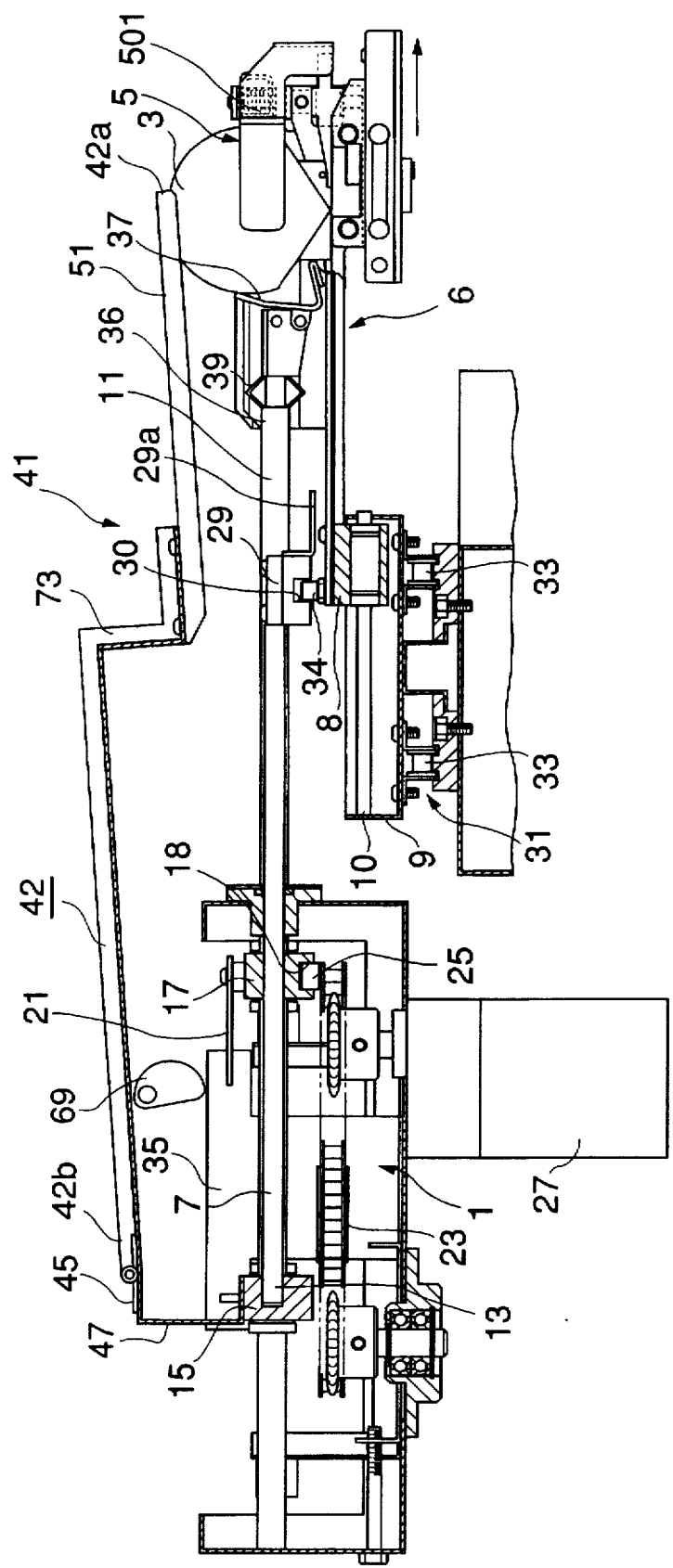
FIG. 16 is a longitudinal cross-section of the part shown in FIG. 15 when the device is brought to an operative position.
Figure 17:
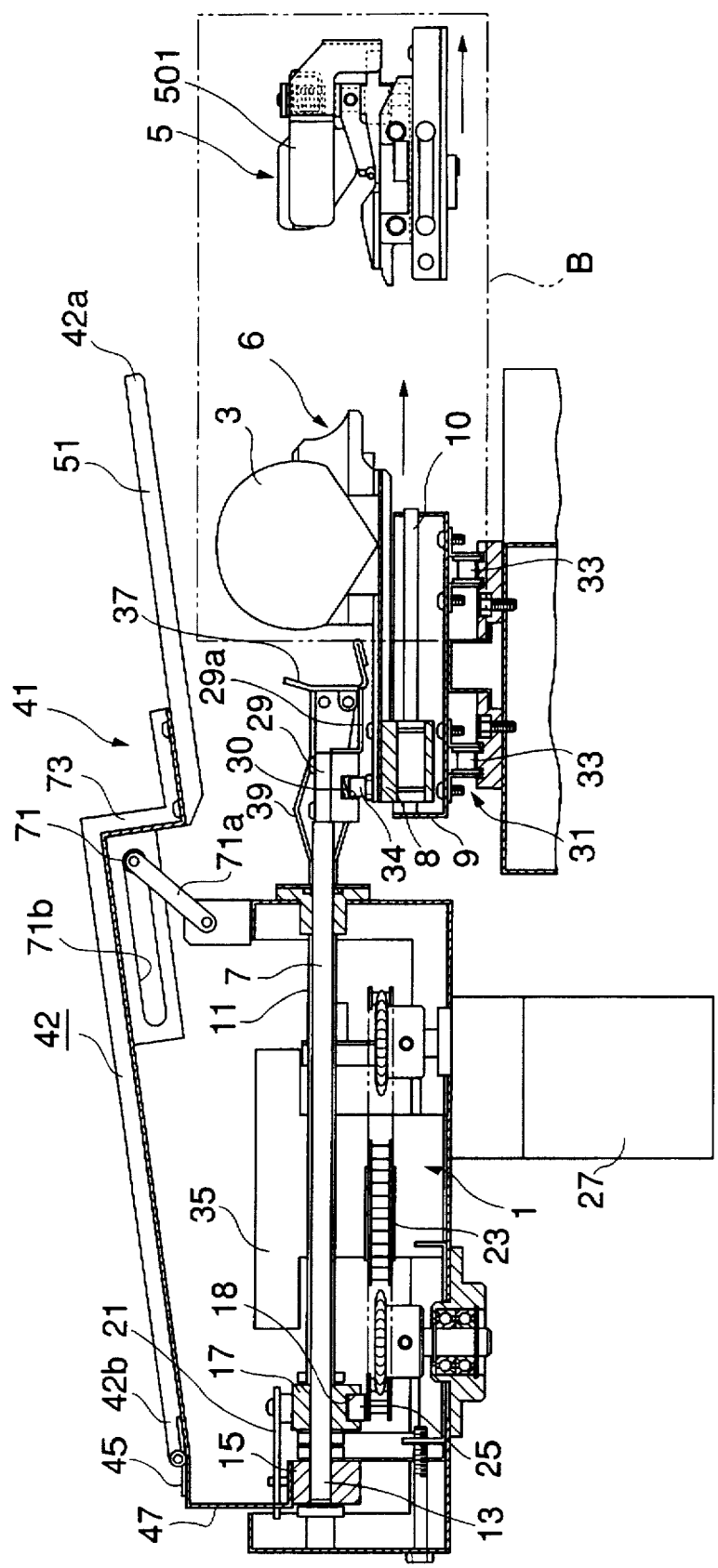
FIG. 17 is a longitudinal cross-section, showing a part corresponding to that shown in FIG. 4, FIG. 13 or FIG. 15, of still another modified embodiment of the shellfish transporting device.
Figure 18:
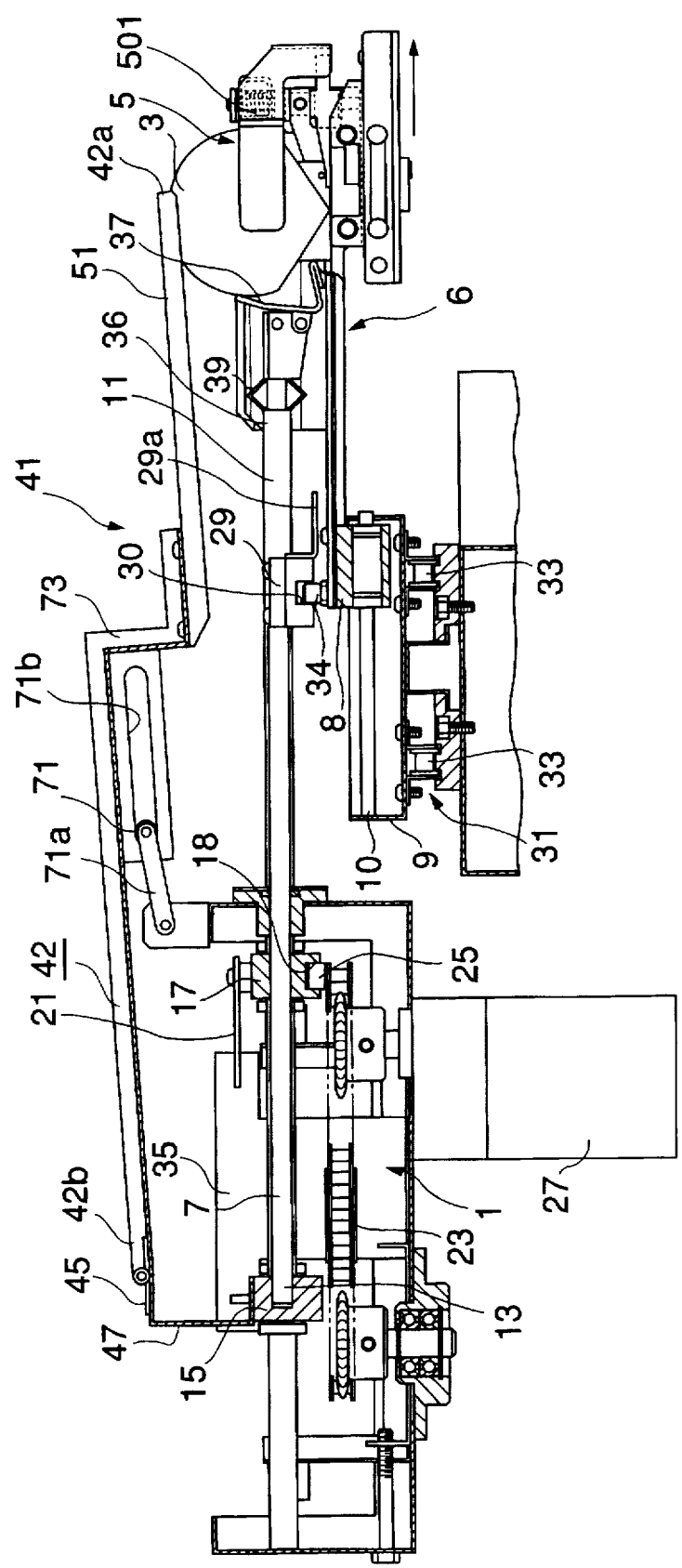
FIG. 18 is a longitudinal cross-section of the part shown in FIG. 17 when the device is brought to an operative position.

FIGS. 15 and 16 shows still another embodiment of the shellfish transfer device according to the present invention employing another type cam as guide means. A cam 69 having irregular semicircle shape in cross-section is used. Cam 69 is rotated in the same manner as cam 67 in the embodiment of FIGS. 13 and 14.

Figure 19:
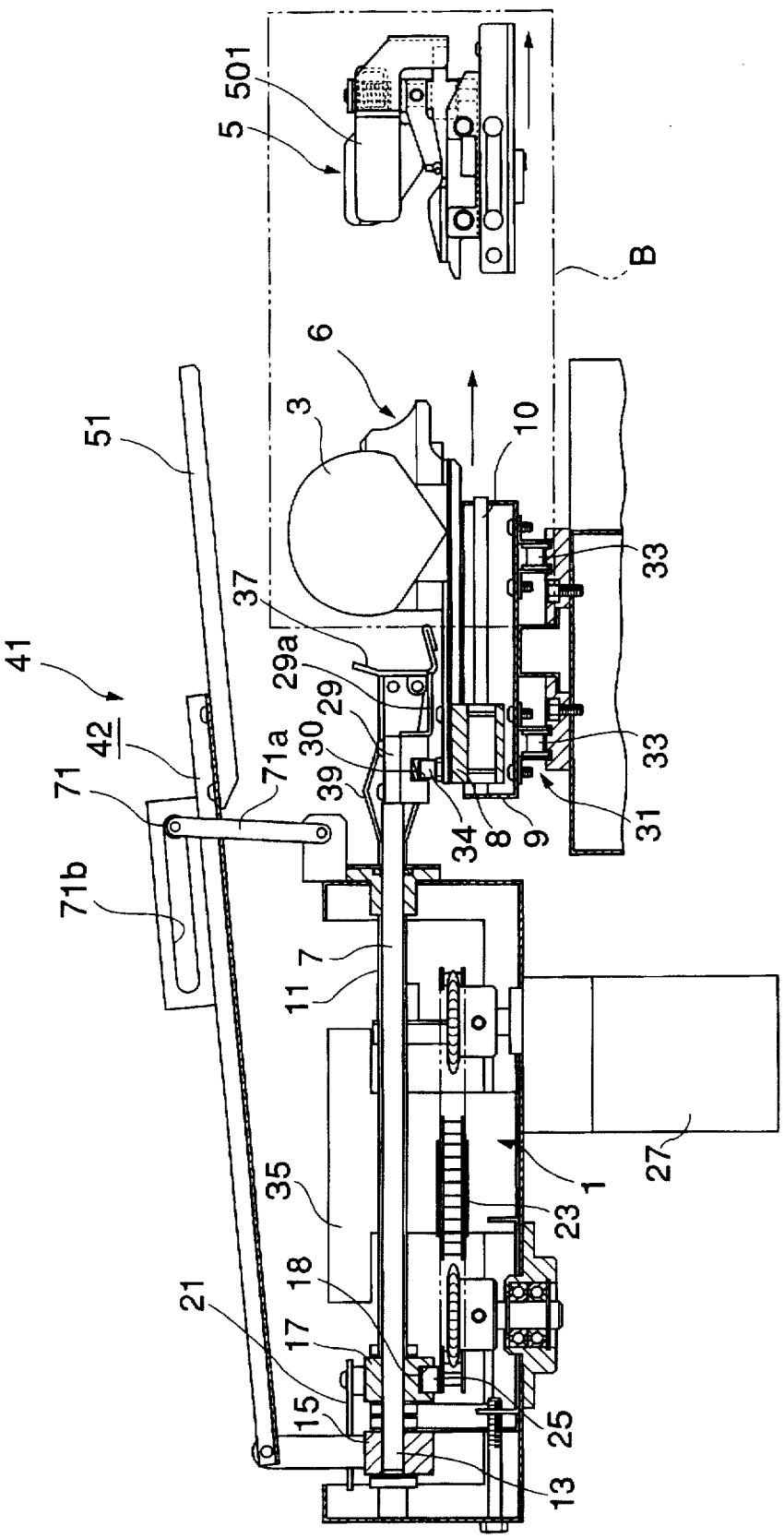
FIG. 19 is a longitudinal cross-section, showing a part corresponding to that shown in FIG. 4, FIG. 13, FIG. 15 or FIG. 17, of still another modified embodiment of the shellfish transporting device.
Figure 20:
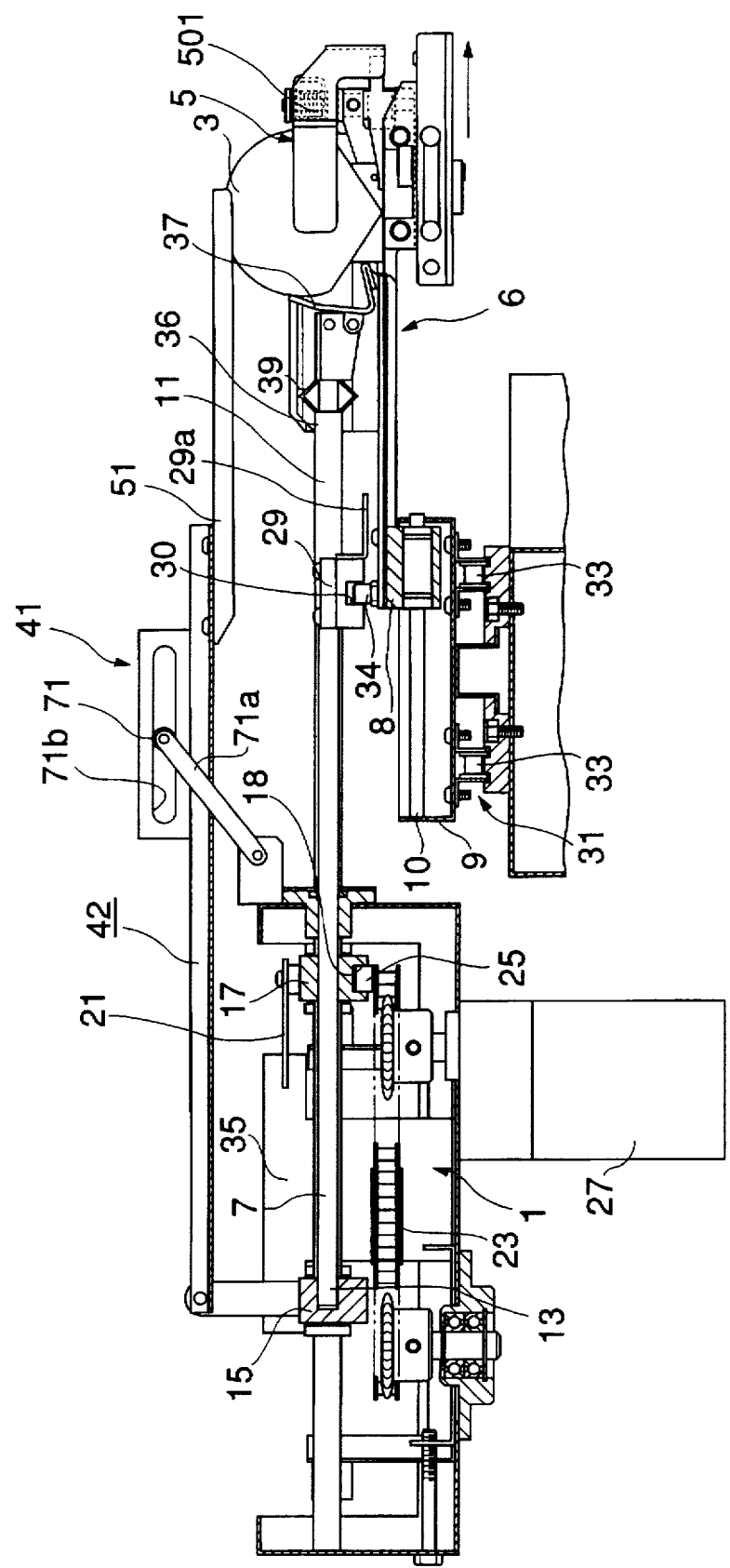
FIG. 20 is a longitudinal cross-section of the part shown in FIG. 19 when the device is brought to an operative position.

When press-down unit 41 comprises pivot arm or arms 42, different inclination angles of segments of first arm member 49 may vary in a wide range depending on application and overall design of the device. For example, first arm member 49 of embodiments shown in FIGS. 15, 16 and 17, 18 has a second segment 73 at right angles to first and third segments. In particular cases, arm 42 may be straight-extending as shown in FIGS. 19 and 20 illustrating a still modified embodiment of the invention. Especially when cam is used as guide member for mechanically interrelating shellfish transfer unit 1 and shellfish press-down unit 41, as in the embodiments of FIGS. 13–14 and 15–16, arm 42 may be a simple linear, straightway one.

Guide roller 52 may be substituted by a guide roller 71 rotatable at one end of a pivotable arm 71a. Guide roller 71 is guided along a guide groove 71b formed in shellfish press-down arm 42, as shown in FIGS. 17–20. An angle of arm 71a and position of guide roller 71 in groove 71b will change to move tip and down arm 42, in response to movement of shaft holders 7 and 11.

Figure 21:
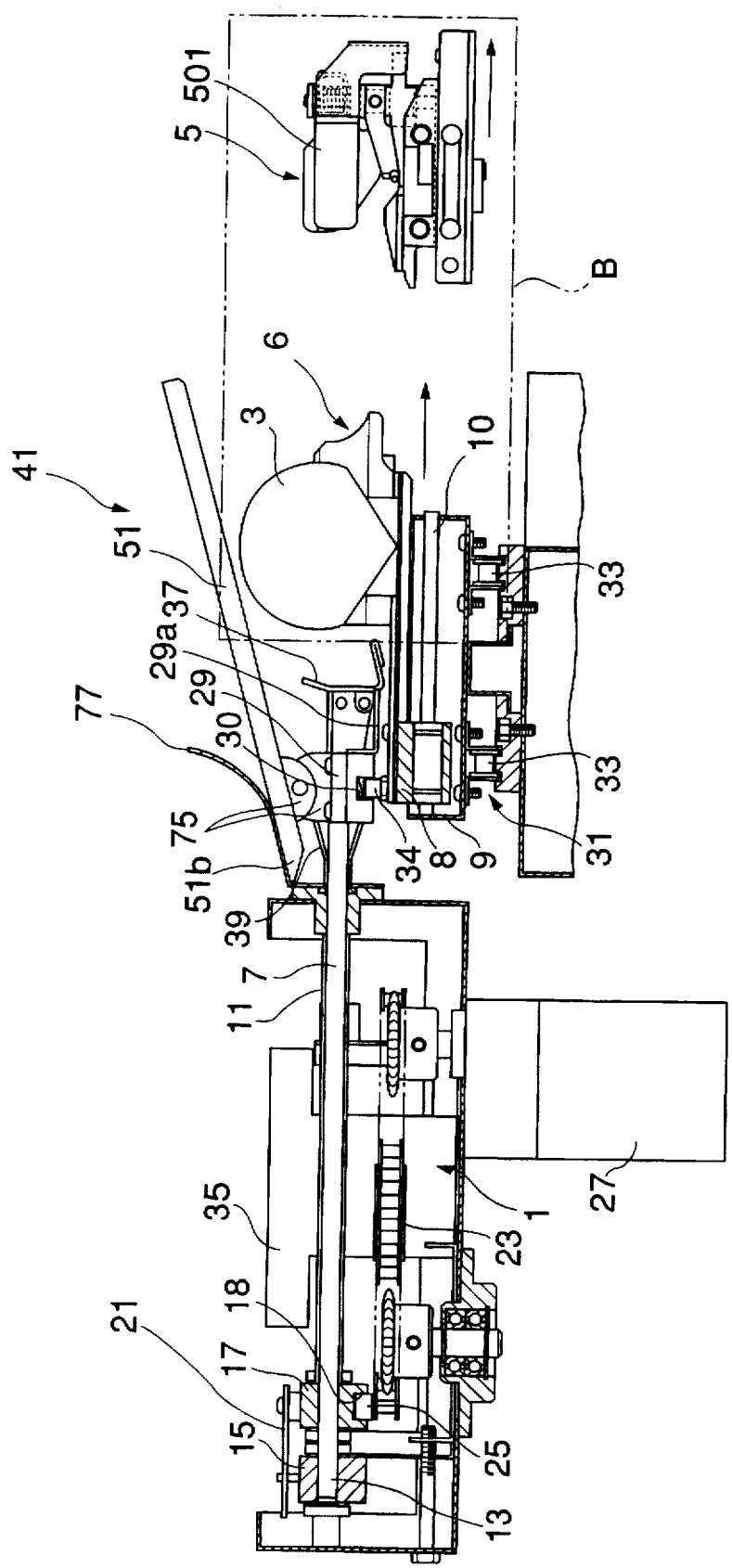
FIG. 21 is a longitudinal cross-section, showing a part corresponding to that shown in FIG. 4, FIG. 13, FIG. 15, FIG. 17 or FIG. 19, of still another modified embodiment of the shellfish transporting device.
Figure 22:
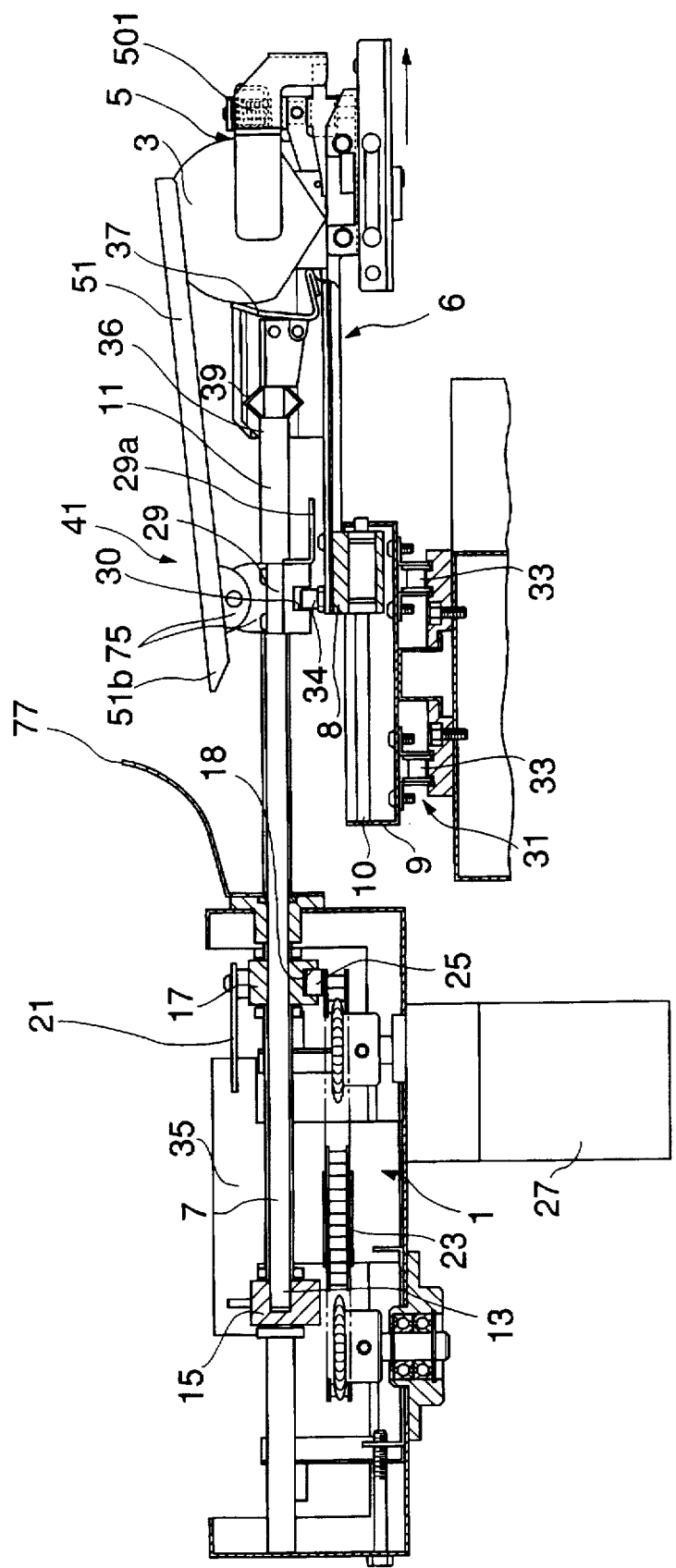
FIG. 22 is a longitudinal cross-section of the part shown in FIG. 21 when the device is brought to an operative position.

Shellfish press-down unit 41 may be so designed that a single arm member 51 is connected directly to shellfish push unit 1. For example, as shown in FIGS. 21 and 22, arm member 51 is, at its base end, rotatably connected to the upper surface of leading end portion 29 of shellfish pocket push shaft 7, via an attachment 75. Reference numeral 77 indicates a guide for opening arm 51 when shellfish pocket 6 is in the initial position.

Figure 23:
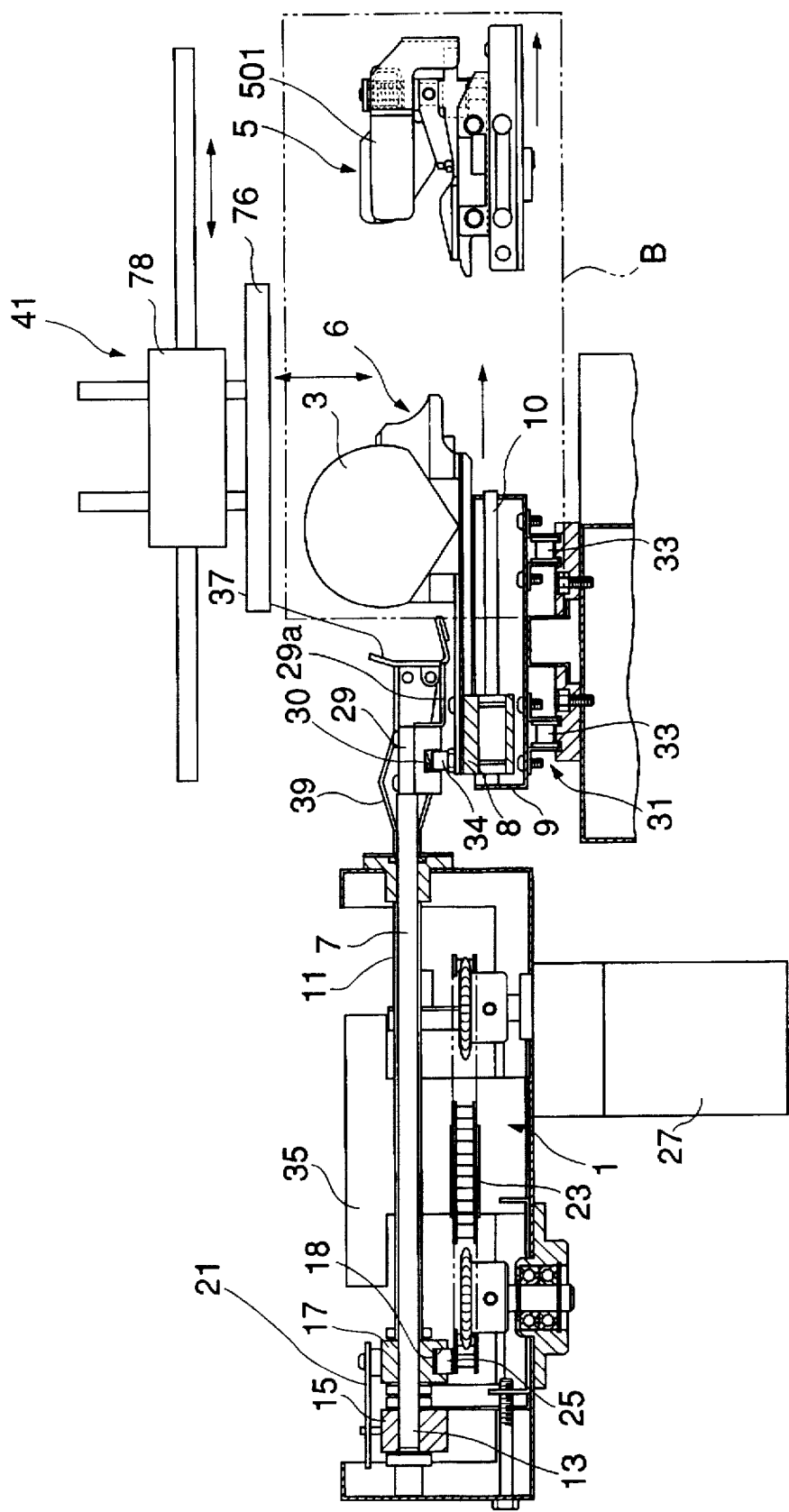
FIG. 23 is a longitudinal cross-section, showing a part corresponding to that shown in FIG. 4, FIG. 13, FIG. 15, FIG. 17, FIG. 19 or FIG. 21, of still another modified embodiment of the shellfish transporting device.
Figure 24:
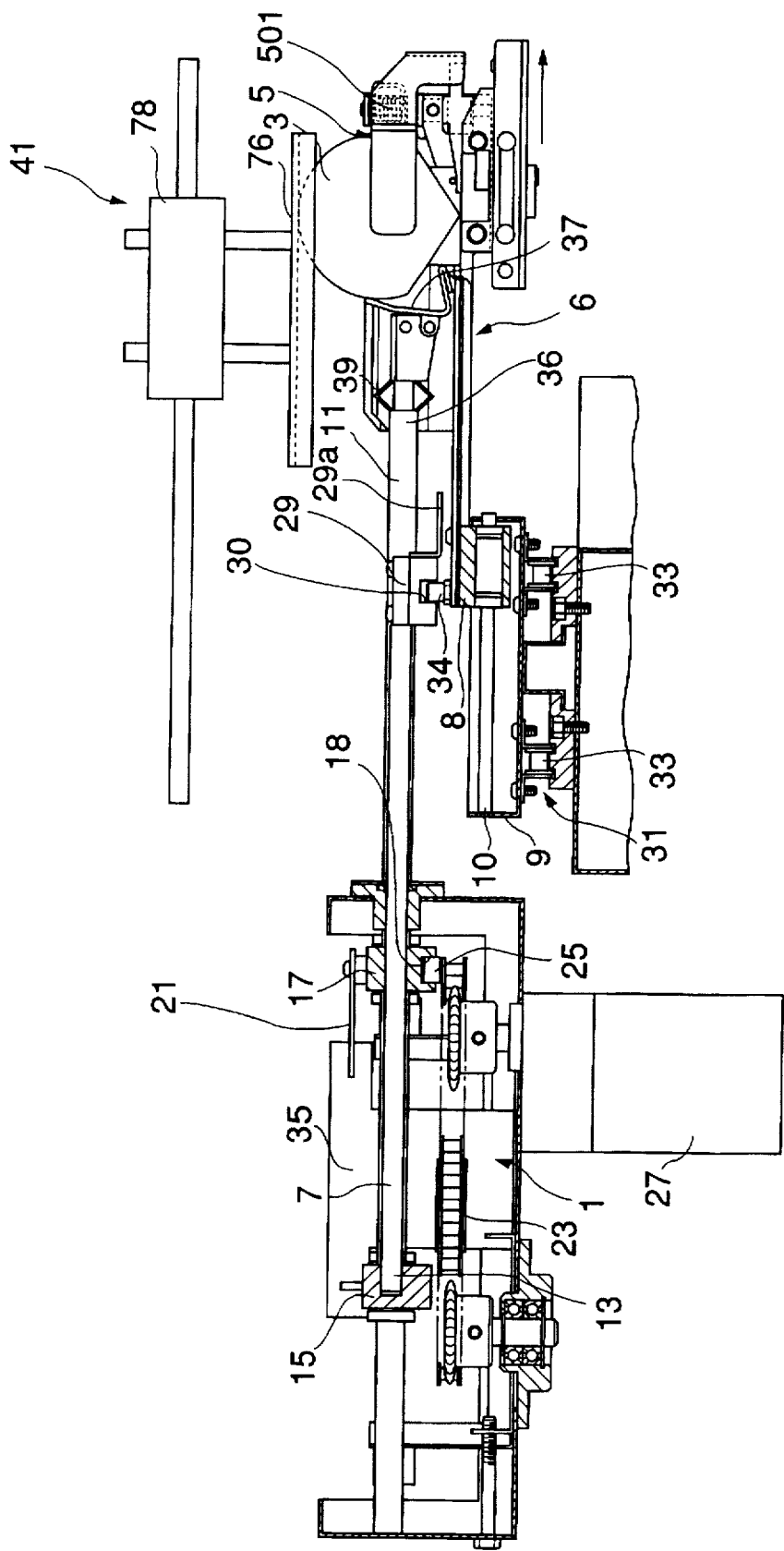
FIG. 24 is a longitudinal cross-section of the part shown in FIG. 23 when the device is brought to an operative position.

Still another modification of shellfish press-down unit 41 is shown in FIGS. 23 and 24. In this embodiment, press-down unit 41 comprises a press-down member 76 and a cylinder 78. Cylinder 78 is itself movable horizontally and moves press-down member 76 in vertical directions. As shown in FIG. 24, when shellfish 3 is transferred to holder 501, press-down member 76 is moved to an appropriate position above shellfish 3 in holder 501, thereby exerting a downward pressure onto shellfish 3. Alternately, press-down member 76 may be lowered when shellfish 3 is held in pocket 6 and moved to the right in synchronism with movement of shellfish push shafts 11 while keeping the lowered position, whereby shellfish 3 is stably held by press-down member 76 during transfer from pocket 6 to holder 501.

Figure 25:
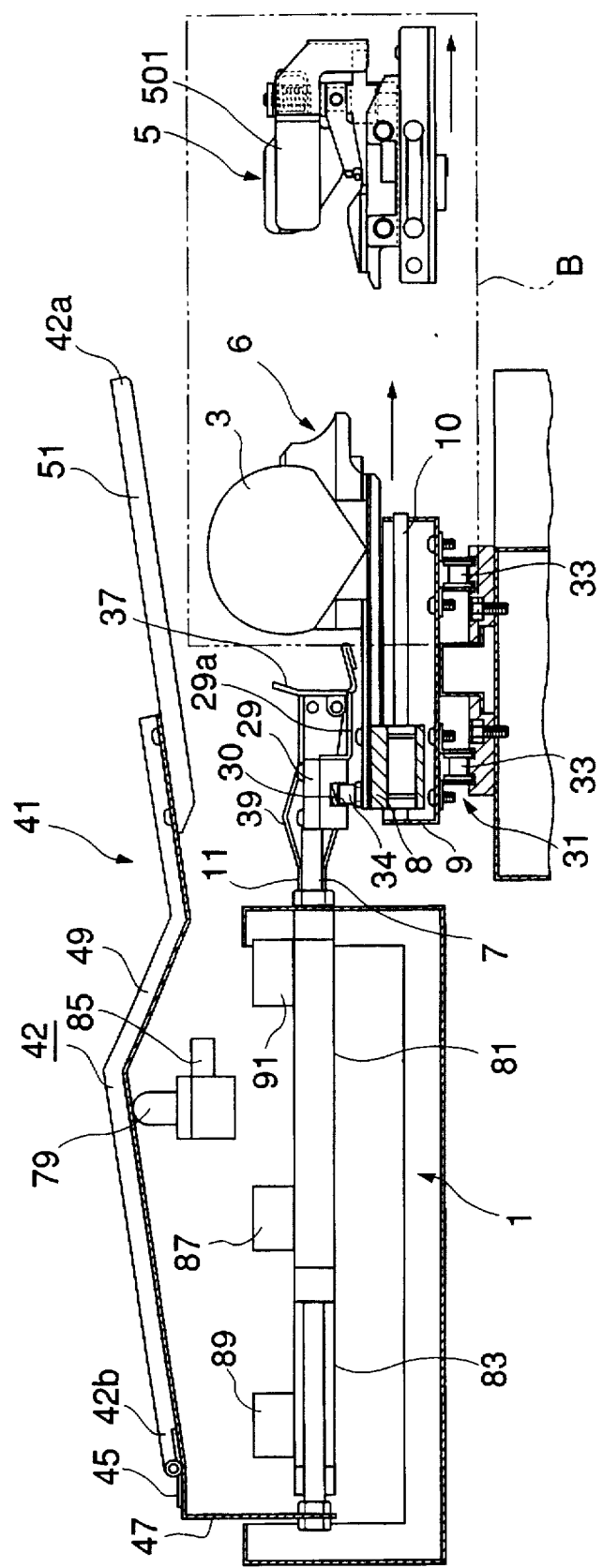
FIG. 25 is a longitudinal cross-section, showing a part corresponding to that shown in FIG. 4, FIG. 13, FIG. 15, FIG. 17, FIG. 19, FIG. 21 or FIG. 23, of still another modified embodiment of the shellfish transporting device.
Figure 26:
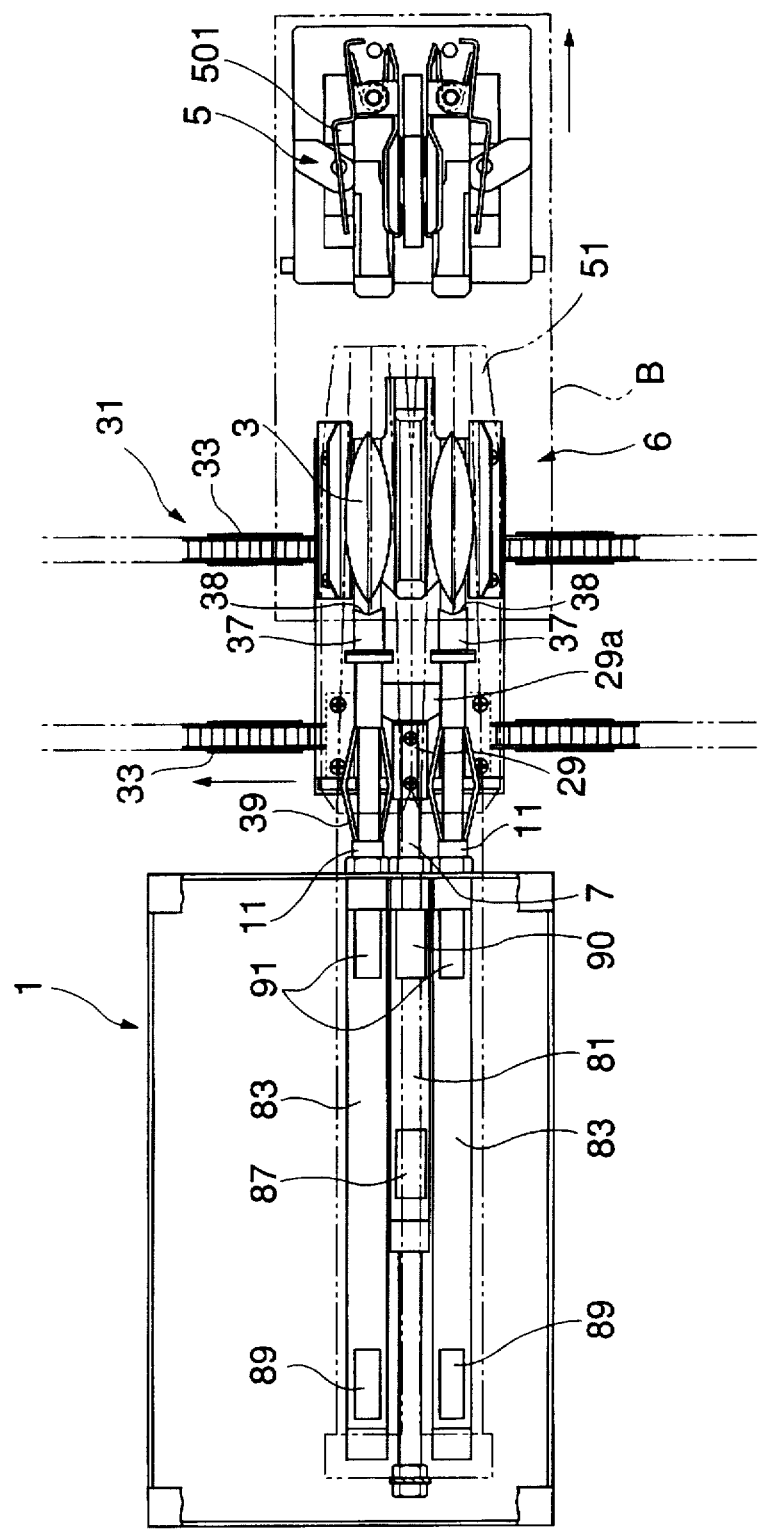
FIG. 26 is a plan view of the part shown in FIG. 25.
Figure 27:
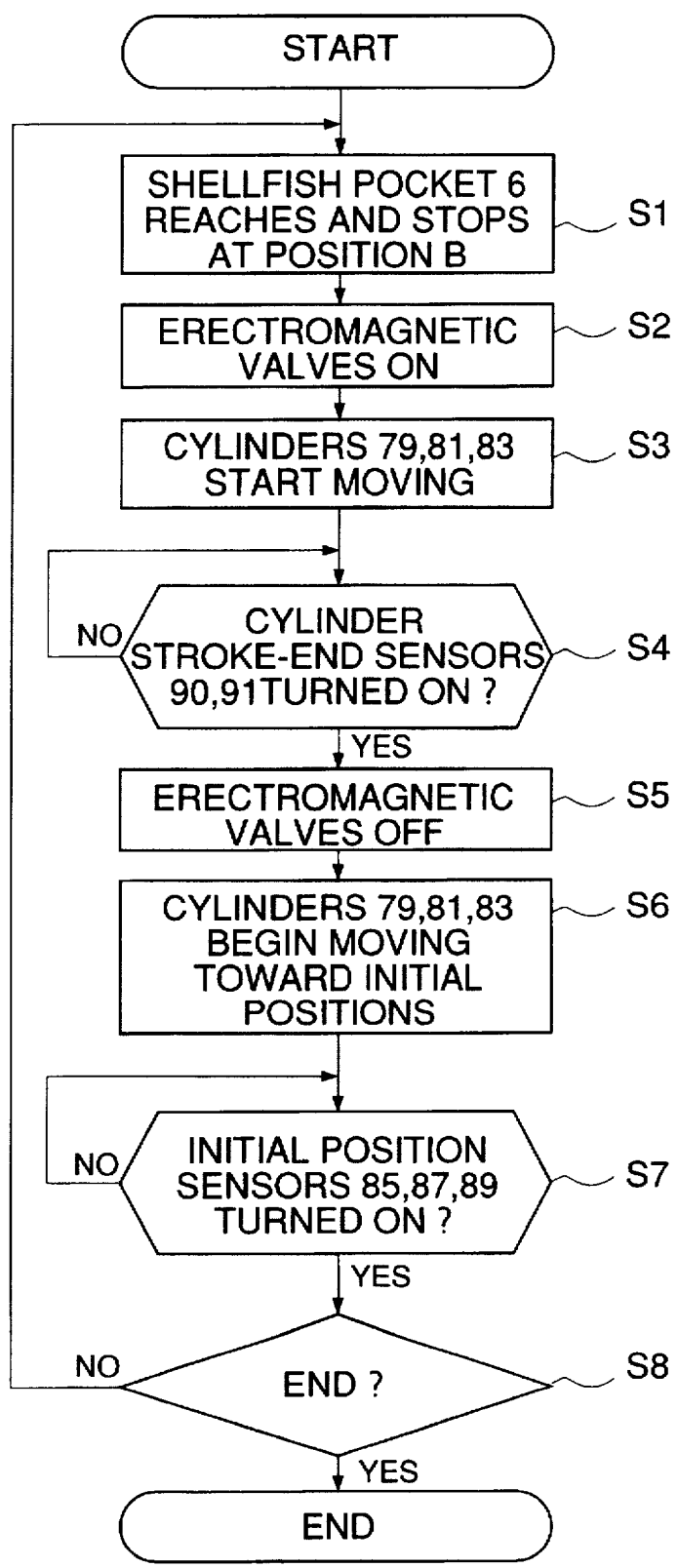
FIG. 27 is a flowchart showing operation of the device of FIG. 25.
Figure 28A:
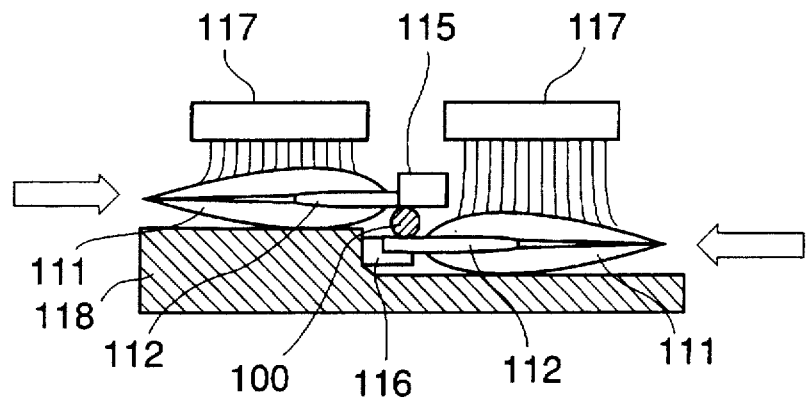
FIGS. 28A and 28B are cross-section and plan view of a prior art shellfish supporting device for use when a shellfish is to be pierced.
Figure 28B:
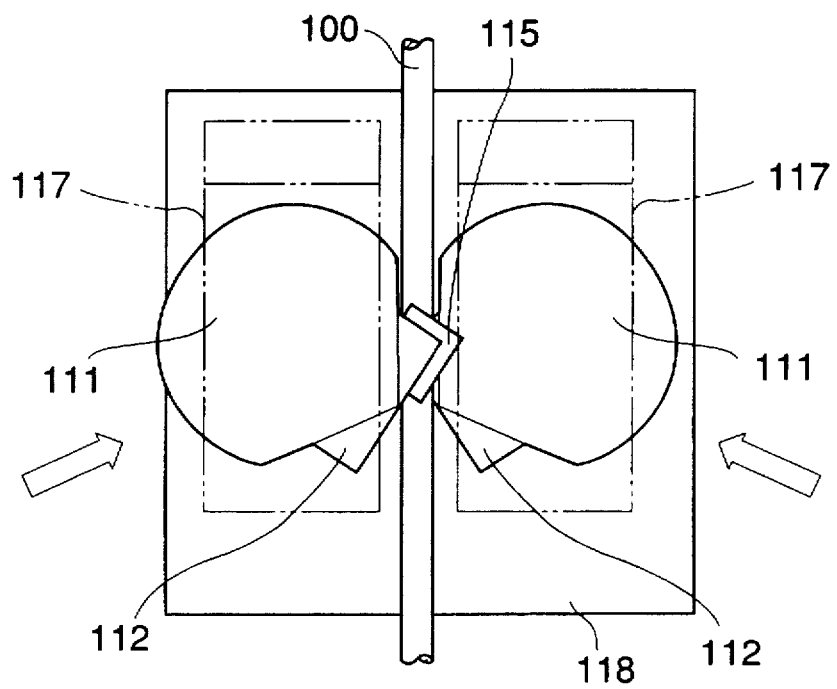
Figure 29:
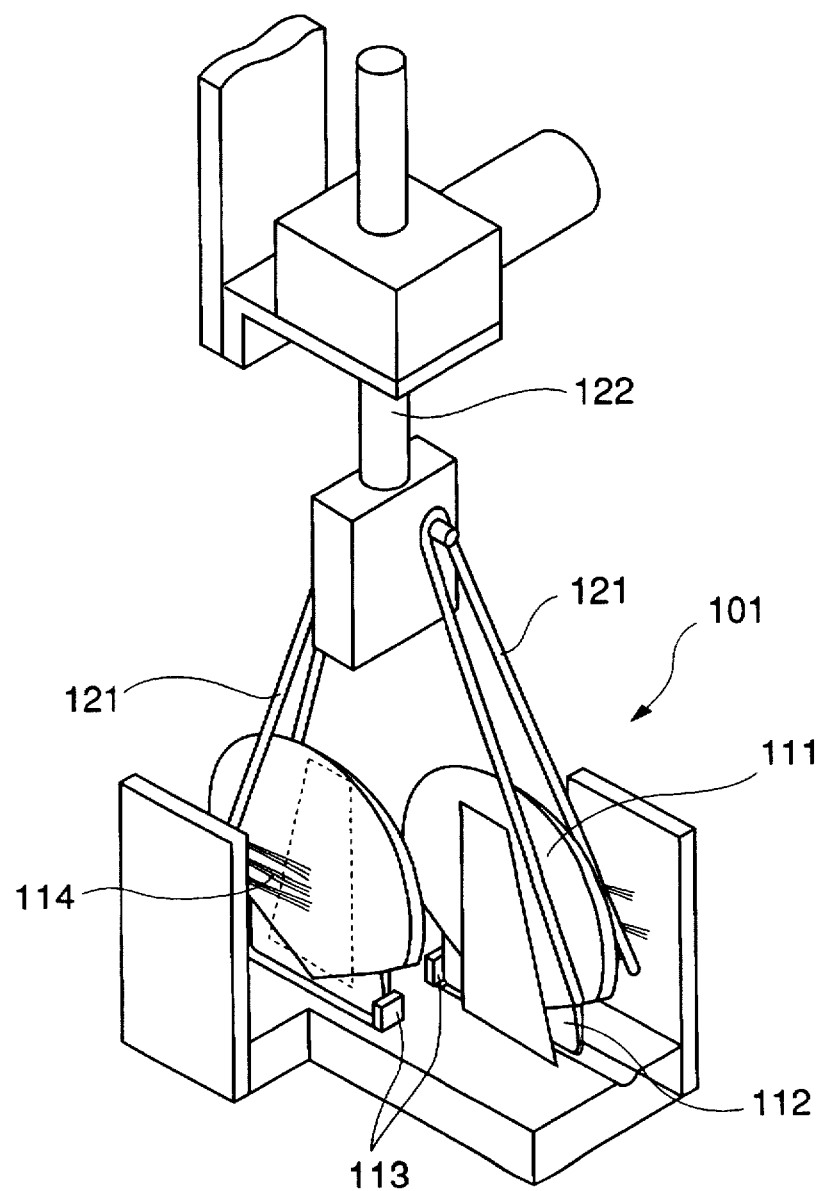
FIG. 29 is a perspective view of another prior art shellfish supporting device.

An example of electrical interrelation between shellfish push unit 1 and shellfish press-down unit 41 is shown in an embodiment shown in FIGS. 25 and 26, in which cylinders are driven in accordance with a series of steps shown in a flowchart of FIG. 27. There are cylinders 81 and 83 that respectively drive shellfish pocket push shaft 7 and shellfish push shaft 11 of shellfish push unit 1, and a cylinder 79 that actuates arms 42 of shellfish press-down unit 41. Each cylinder has an electromagnetic valve. Sensors 85, 87 and 89 detect the initial positions of cylinders 79, 81 and 83, respectively.

Referring specifically to the flowchart of FIG. 27, when one of shellfish pockets 6 stops at the delivery position B (S1), electromagnetic valves of respective cylinders 79, 81 and 83 are turned ON (S2) to start cylinders all at once (S3). Cylinder 79 begins to shrink, thereby rotating clockwise (in FIG. 25) arms 42 so that second arm member 51 presses shellfish 3 from above.

More particularly, cylinder 81 causes shellfish pocket 6 to move to the right, with shellfish supported thereon being held by arms 42 that have been lowered by shrinkage of cylinder 79. When pocket 6 stops by collision to holder 501, it is detected by a stroke-end sensor 90 to output a signal. Then, cylinders 83, 83 causes shellfish 3 on pocket 6 to move to the right toward shellfish holder 501. When cylinders 83, 83 stop by collision to a stopper wall (position D in FIG. 11), it is detected by stroke-end sensors 91, 91 to output a signal. In response to these signals from stroke-end sensors 90 and 91 (S4), electromagnetic valves of cylinders 79, 81 and 83 are all turned OFF (S5), causing cylinders 79, 81 and 83 to run in the reverse directions toward their initial positions (S6). Arms 42 turn to lift and shellfish pocket 6 begins moving to the left. When sensors 85, 87 and 89 are all turned ON (S7), meaning that cylinders 79, 81 and 83 are all returned to their initial positions, one cycle operation is completed.

In the above described embodiment, cylinder 79 may be substituted by a solenoid.

In the present invention, any suitable means may be employed to move shellfish pocket push shaft 7 and shellfish push shaft 11. For example, it can be a ball screw drive mechanism. In the embodiment of FIGS. 25 and 26, actuating member 29a may be attached directly to the leading end of cylinder 81, making it unnecessary to use shaft 7. Similarly, actuating attachment 37 may be attached directly to the leading end of cylinder 83, making it unnecessary to use shaft 11.

Chains 31 and 61 are only exemplary and any other types of endless drive units may be used to circulate pins 25 and 34, respectively.

Although a single drive source is preferably used to drive shellfish push unit 1 and shellfish press-down unit 41 in view of simple mechanism and miniaturization of the device, it is within a range of this invention to use plural drive sources to drive plural members separately.

Shellfish 3 that has been delivered to holder 501 is then transferred to the next stop position 502 to be subjected to any kind of necessary operation. Although shellfish 3 is subjected to piercing operation at the position 502, a gut passes through the ear end portions 3a of shellfish 3 at this position.

In the foregoing description and drawings, scallop is illustrated as shellfish 3, but the device of this invention can treat any kind of bivalves.

What is claimed is:

1. A shellfish transfer device comprising shellfish holders that respectively hold at least one shellfish; a shellfish push unit that forces shellfish of a predetermined exposure toward at least one of said shellfish holders; and a shellfish press-down unit driven in synchronism with said shellfish push unit to exert a downward pressure to the shellfish held by said shellfish holder, said predetermined exposure of the shellfish being substantially maintained relative to said shellfish holder during operation by said shellfish press-down unit.

2. A device according to claim 1 which further comprises a mechanical interrelation member that moves said shellfish press-down unit in response to movement of said shellfish push unit.

3. A device according to claim 1 which further comprises an electrical interrelation member that moves said shellfish press-down unit in response to movement of said shellfish push unit.

4. A device according to claim 1 wherein said shellfish press-down unit comprises at least one arm member rotatably connected to said shellfish push unit, said at least one arm member being extended to above the shellfish mounted on said shellfish holder.

5. A device according to claim 4 wherein said at least one arm member comprises plural segments having different angles of inclination.

6. A device according to claim 4 wherein said at least one arm member comprises dogleg-connected segments.

7. A device according to claim 4 wherein said at least one arm member is substantially straight-extending.

8. A device according to claim 1 wherein said shellfish press-down unit comprises one or more of press-down members adapted to move horizontally and vertically.

9. A device according to claim 1 which further comprises guide means for guiding up-and-down movement of said shellfish press-down unit in response to horizontal movement of said shellfish push unit.

10. A device according to claim 9 wherein said guide means comprises one or more of guide rollers engageable with bottom of an arm member of said shellfish press-down unit.

11. A device according to claim 9 wherein said guide means comprises one or more of cam members engageable with a bottom of an arm member of said shellfish press-down unit.

12. A device according to claim 9 wherein said guide means comprises cylinders that separately operate said shellfish push unit and said shellfish press-down unit.

13. A device according to claim 1 wherein said shellfish push unit comprises one or more of movable shellfish pocket push members; at least one movable shellfish pocket supporting thereon the shellfish and forced by said shellfish pocket push members toward said shellfish holder; and one or more of movable shellfish push members that convey the shellfish on said shellfish pocket onto said shellfish holder; said shellfish pocket push members being first advanced and said shellfish push member being advanced after said shellfish pocket push members stop.

14. A device according to claim 13 wherein said shellfish pocket push members and said shellfish push members comprise shaft members, respectively.

15. A device according to claim 13 wherein said shellfish pocket push members and said shellfish push members comprise cylinders having different telescoping strokes.

16. A device according to claim 13 wherein said shellfish pocket push members comprise shaft member and said shellfish press-down unit comprises arm members pivotably connected to a base end of said shaft member.

17. A device according to claim 13 wherein said shellfish pocket push members comprise at least one of shellfish pocket push shaft fixed at its base end to a first shaft holder and slidably extending through a second shaft holder connected to said first shaft holder by a spring and also by an engaging plate, and said shellfish push members comprise one or more of shellfish push shafts fixed at its base end to said second shaft holder and extending in parallel with said at least one shellfish pocket push shaft.

18. A device according to claim 13 which further comprises a spring that forces said shellfish push members toward said shellfish pocket.

19. A device according to claim 1 wherein said shellfish push unit and said shellfish press-down unit are moved in response to circulation of an intermittently driven endless conveyor.

20. A device according to claim 17 which further comprises first and second intermittently driven endless chain conveyors, said first chain conveyor having spaced chain blocks each having a pin engageable with said shellfish push members and said second chain conveyor having spaced chain blocks each having a pin engageable with said shellfish pocket push members.

21. A device according to claim 1 further comprising a single drive source for driving both said shellfish push unit and said shellfish press-down unit.

* * * * *